(12) United States Patent
Merlin et al.

(10) Patent No.: US 10,499,418 B2
(45) Date of Patent: Dec. 3, 2019

(54) METHODS AND APPARATUS FOR MULTIPLE USER UPLINK CONTROL AND SCHEDULING VIA AGGREGATED FRAMES

(71) Applicant: QUALCOMM Incorporated, San Diego, CA (US)

(72) Inventors: Simone Merlin, Solana Beach, CA (US); Bin Tian, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 14/794,702

(22) Filed: Jul. 8, 2015

(65) Prior Publication Data

US 2016/0014804 A1 Jan. 14, 2016

Related U.S. Application Data

(60) Provisional application No. 62/022,598, filed on Jul. 9, 2014.

(51) Int. Cl.
*H04W 72/12* (2009.01)
*H04L 5/00* (2006.01)
*H04W 72/00* (2009.01)
*H04W 88/02* (2009.01)
*H04W 88/08* (2009.01)

(52) U.S. Cl.
CPC ....... *H04W 72/1284* (2013.01); *H04L 5/0044* (2013.01); *H04W 72/005* (2013.01); *H04W 88/02* (2013.01); *H04W 88/08* (2013.01)

(58) Field of Classification Search
CPC .. H04L 5/0044; H04W 72/005; H04W 72/12; H04W 72/1284; H04W 88/08; H04W 88/02; H04W 28/06; H04W 28/065; H04W 74/004; H04W 84/12; H04B 7/0452
See application file for complete search history.

(56) References Cited

U.S. PATENT DOCUMENTS 7,948,991 B1 * 5/2011 Hart ................. H04L 1/1854
370/395.4
8,665,906 B1 * 3/2014 Liu ................. H04B 7/0617
370/349
9,173,234 B2 10/2015 Merlin et al.
9,337,961 B2 5/2016 Wentink
(Continued)

FOREIGN PATENT DOCUMENTS

CN 102893534 A 1/2013
CN 102948101 A 2/2013
(Continued)

OTHER PUBLICATIONS

International Search Report and Written Opinion—PCT/US2015/039783—ISA/EPO—dated Oct. 2, 2015.

*Primary Examiner* — Rina C Pancholi
(74) *Attorney, Agent, or Firm* — Paradice and Li LLP; Kevin M. Donnelly

(57) ABSTRACT

Methods and apparatus for multiple user uplink are provided. In one aspect, a method includes generating, at an access point, an aggregated message. The aggregated message includes a single-user broadcast message and at least one other message. The method further includes transmitting the aggregated message to one or more stations.

28 Claims, 16 Drawing Sheets

(56) References Cited

U.S. PATENT DOCUMENTS

| | | | | |
|---|---|---|---|---|
| 2005/0226273 | A1* | 10/2005 | Qian | H04L 1/1628 370/474 |
| 2009/0129331 | A1* | 5/2009 | Wu | H04W 72/082 370/330 |
| 2010/0220678 | A1* | 9/2010 | Wentink | H04W 72/1289 370/329 |
| 2011/0150004 | A1* | 6/2011 | Denteneer | H04L 5/0023 370/476 |
| 2014/0126509 | A1* | 5/2014 | You | H04B 7/04 370/329 |
| 2014/0269544 | A1* | 9/2014 | Zhu | H04L 1/1671 370/329 |
| 2015/0124690 | A1 | 5/2015 | Merlin et al. | |

FOREIGN PATENT DOCUMENTS

| | | | |
|---|---|---|---|
| JP | 2013511938 | A | 4/2013 |
| WO | WO-2011123625 | A1 | 10/2011 |
| WO | WO-2011159831 | A1 | 12/2011 |
| WO | WO-2014052879 | A1 | 4/2014 |

\* cited by examiner

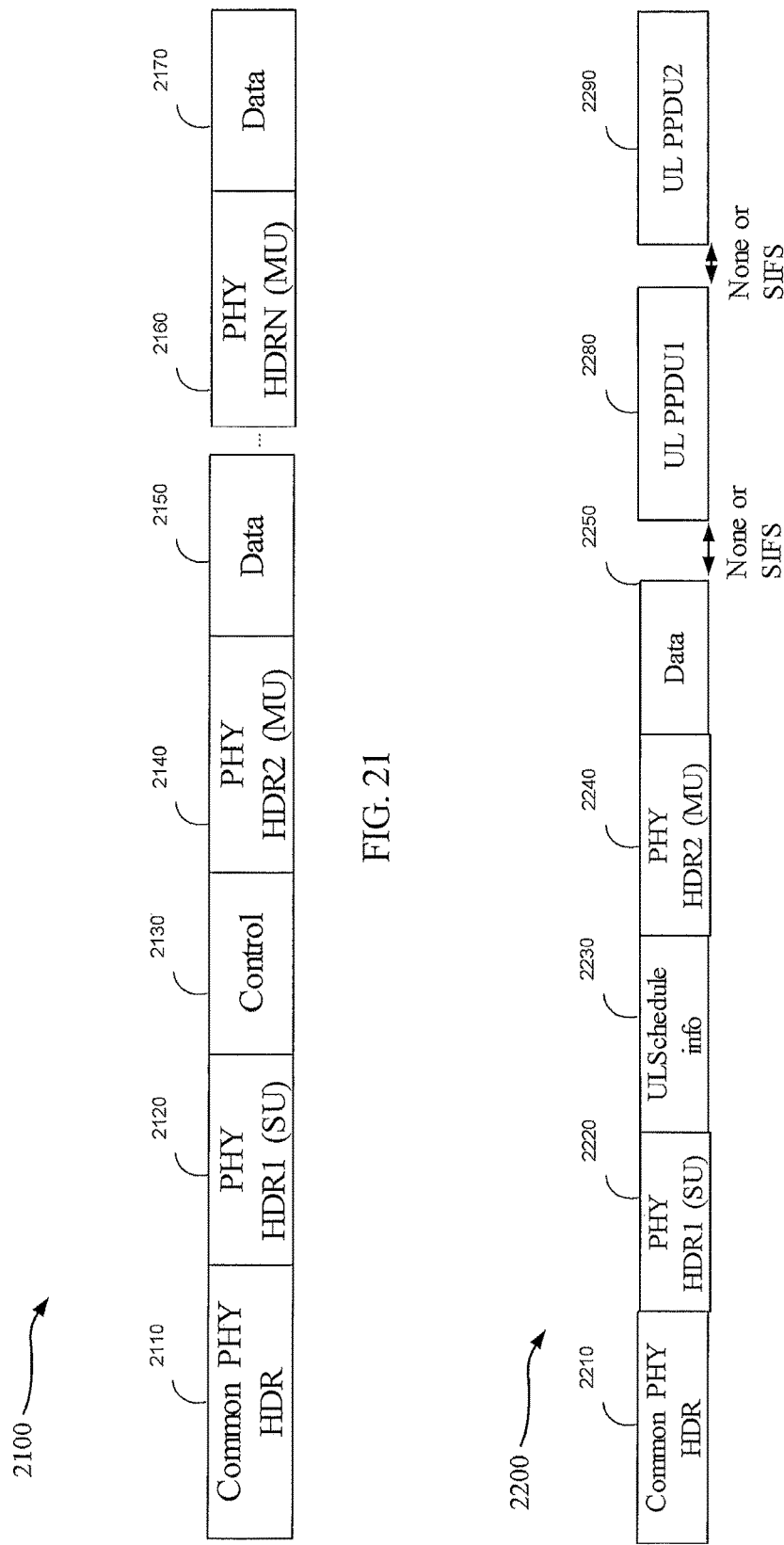

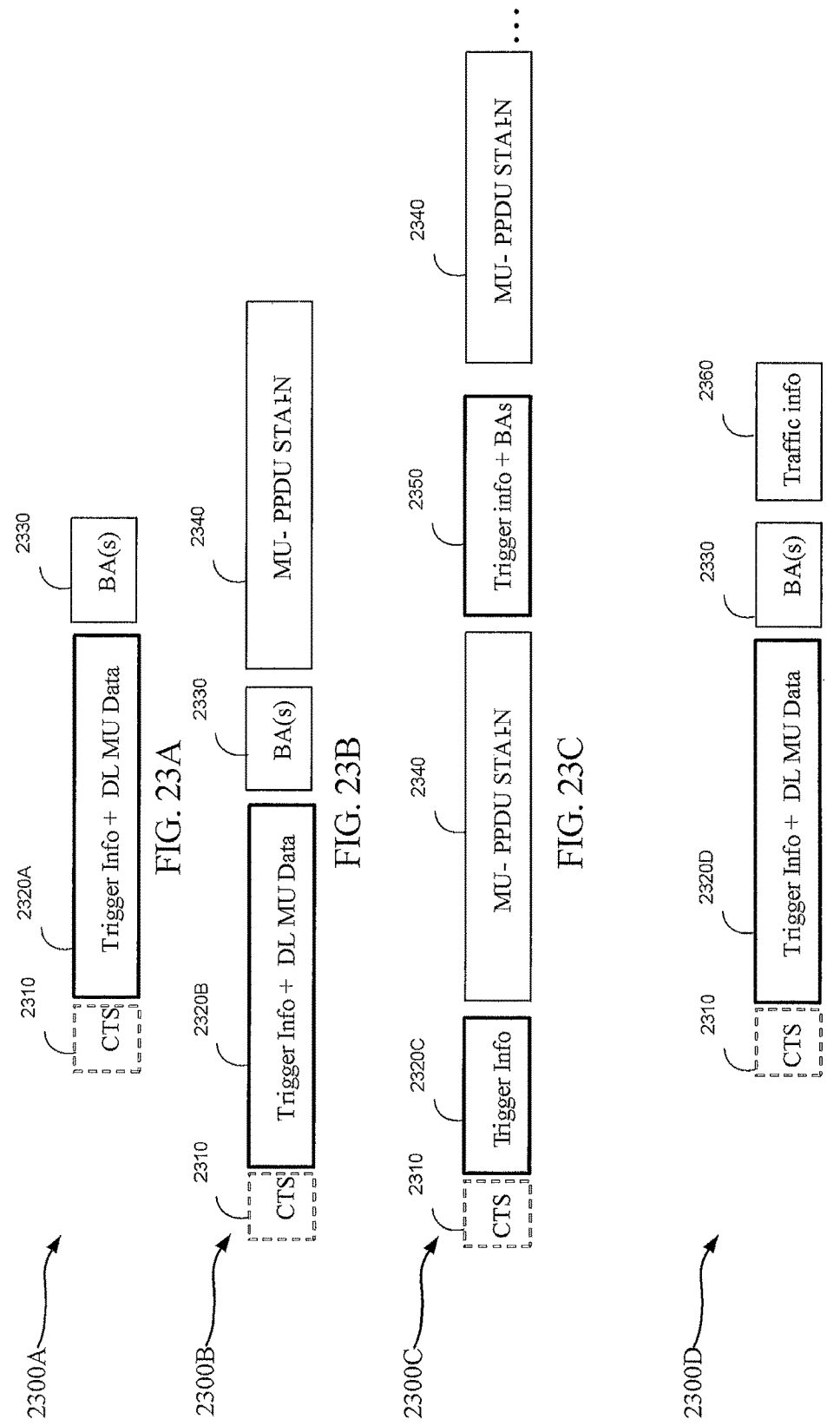

METHODS AND APPARATUS FOR MULTIPLE USER UPLINK CONTROL AND SCHEDULING VIA AGGREGATED FRAMES

CROSS-REFERENCE TO RELATED APPLICATIONS

This application claims priority under 35 U.S.C. § 119(e) to U.S. Provisional App. No. 62/022,598, filed Jul. 9, 2014, which is incorporated by reference herein in its entirety.

FIELD

Certain aspects of the present disclosure generally relate to wireless communications, and more particularly, to methods and apparatus for multiple user uplink communication in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple stations (STAs) to communicate with a single access point by sharing the channel resources while achieving high data throughputs. With limited communication resources, it is desirable to reduce the amount of traffic passing between the access point and the multiple STAs. For example, when multiple STAs send uplink communications to the access point, it is desirable to minimize the amount of traffic to complete the uplink of all transmissions. Thus, there is a need for an improved protocol for uplink transmissions from multiple STAs.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method for wireless communication. The method includes generating, at an access point, an aggregated message. The aggregated message includes a single-user broadcast message and at least one other message. The method further includes transmitting the aggregated message to one or more stations.

In various embodiments, each sub-message of the aggregated message can include at least a physical layer data unit (PPDU) comprising a physical layer (PHY) control field and a media access control (MAC) payload. In various embodiments, the at least one other message can include at least one multi-user physical layer data unit (PPDU). In various embodiments, the at least one other message can include at least one single-user physical layer data unit (PPDU) excluding control or scheduling information.

In various embodiments, the aggregated message can include the single-user broadcast message and one or more multi-user messages. In various embodiments, the aggregated message can include a common physical layer header indicating whether the at least one other message includes at least message that all of the one or more stations are instructed to decode. In various embodiments, each message can include a physical layer header indicating whether the at least one other message includes at least message that all of the one or more stations are instructed to decode.

In various embodiments, the single-user broadcast message includes control information instructing the one or more stations to transmit a plurality of uplink data at a specified time. In various embodiments, the method can further include receiving transmission of the plurality of uplink data at the specified time, each transmission of the plurality of uplink data having the same duration. In various embodiments, the method can further include transmitting an acknowledgment message to the one or more stations.

In various embodiments, each message can include an uplink scheduling message. In various embodiments, the uplink scheduling message can include a physical layer data unit (PPDU) duration field indicating a duration of transmission of uplink data. In various embodiments, the uplink scheduling message can include a station access information field including an indication of allowed transmission modes.

In various embodiments, the station access information field can include a tone allocation field indicating tones/frequencies for uplink data using a frequency division multiple access (FDMA) system. In various embodiments, the uplink scheduling message can include a group identifier (GID) field indicating the stations that can participate in uplink communications. In various embodiments, the uplink scheduling message can include a receiver address (RA) field indicating a multicast address which identifies the one or more stations that can participate in uplink communications. In various embodiments, the uplink scheduling message can include a field indicating rate information for the one or more stations.

In various embodiments, the method can further include transmitting an uplink scheduling message to the one or more stations. The uplink scheduling message can instruct the one or more stations to transmit a station access information message in response to the uplink scheduling message. The method can further include receiving a plurality of station access information messages. The station access information messages can indicate station access information. In various embodiments, the single-user broadcast message can include data, control, or management information for one or more stations.

Another aspect provides an apparatus configured for wireless communication. The apparatus includes a processor configured to generate for transmission an aggregated message. The aggregated message includes a single-user broadcast message and at least one other message. The apparatus further includes a transmitter configured to transmit the aggregated message to one or more stations.

In various embodiments, each sub-message of the aggregated message can include at least a physical layer data unit (PPDU) comprising a physical layer (PHY) control field and a media access control (MAC) payload. In various embodiments, the at least one other message can include at least one multi-user physical layer data unit (PPDU). In various embodiments, the at least one other message can include at least one single-user physical layer data unit (PPDU) excluding control or scheduling information.

In various embodiments, the aggregated message can include the single-user broadcast message and one or more multi-user messages. In various embodiments, the aggregated message can include a common physical layer header indicating whether the at least one other message includes at least message that all of the one or more stations are instructed to decode. In various embodiments, each message can include a physical layer header indicating whether the at least one other message includes at least message that all of the one or more stations are instructed to decode.

In various embodiments, the single-user broadcast message includes control information instructing the one or more stations to transmit a plurality of uplink data at a specified time. In various embodiments, the apparatus can further include a receiver configured to receive transmission of the plurality of uplink data at the specified time, each transmission of the plurality of uplink data having the same duration. In various embodiments, the transmitter can be further configured to transmit an acknowledgment message to the one or more stations.

In various embodiments, each message can include an uplink scheduling message. In various embodiments, the uplink scheduling message can include a physical layer data unit (PPDU) duration field indicating a duration of transmission of uplink data. In various embodiments, the uplink scheduling message can include a station access information field including an indication of allowed transmission modes.

In various embodiments, the station access information field can include a tone allocation field indicating tones/frequencies for uplink data using a frequency division multiple access (FDMA) system. In various embodiments, the uplink scheduling message can include a group identifier (GID) field indicating the stations that can participate in uplink communications. In various embodiments, the uplink scheduling message can include a receiver address (RA) field indicating a multicast address which identifies the one or more stations that can participate in uplink communications. In various embodiments, the uplink scheduling message can include a field indicating rate information for the one or more stations.

In various embodiments, the apparatus can further include a transmitter configured to transmit an uplink scheduling message to the one or more stations. The uplink scheduling message can instruct the one or more stations to transmit a station access information message in response to the uplink scheduling message. The receiver can be further configured to receive a plurality of station access information messages, the station access information messages indicating station access information. In various embodiments, the single-user broadcast message can include data, control, or management information for one or more stations.

Another aspect provides an apparatus for wireless communication. The apparatus includes means for transmitting an aggregated message. The aggregated message includes a single-user broadcast message and at least one other message. The apparatus further includes means for transmitting the aggregated message to one or more stations.

In various embodiments, each sub-message of the aggregated message can include at least a physical layer data unit (PPDU) comprising a physical layer (PHY) control field and a media access control (MAC) payload. In various embodiments, the at least one other message can include at least one multi-user physical layer data unit (PPDU). In various embodiments, the at least one other message can include at least one single-user physical layer data unit (PPDU) excluding control or scheduling information.

In various embodiments, the aggregated message can include the single-user broadcast message and one or more multi-user messages. In various embodiments, the aggregated message can include a common physical layer header indicating whether the at least one other message includes at least message that all of the one or more stations are instructed to decode. In various embodiments, each message can include a physical layer header indicating whether the at least one other message includes at least message that all of the one or more stations are instructed to decode.

In various embodiments, the single-user broadcast message includes control information instructing the one or more stations to transmit a plurality of uplink data at a specified time. In various embodiments, the apparatus can further include means for receiving transmission of the plurality of uplink data at the specified time, each transmission of the plurality of uplink data having the same duration. In various embodiments, the apparatus can further include means for transmitting an acknowledgment message to the one or more stations.

In various embodiments, each message can include an uplink scheduling message. In various embodiments, the uplink scheduling message can include a physical layer data unit (PPDU) duration field indicating a duration of transmission of uplink data. In various embodiments, the uplink scheduling message can include a station access information field including an indication of allowed transmission modes.

In various embodiments, the station access information field can include a tone allocation field indicating tones/frequencies for uplink data using a frequency division multiple access (FDMA) system. In various embodiments, the uplink scheduling message can include a group identifier (GID) field indicating the stations that can participate in uplink communications. In various embodiments, the uplink scheduling message can include a receiver address (RA) field indicating a multicast address which identifies the one or more stations that can participate in uplink communications. In various embodiments, the uplink scheduling message can include a field indicating rate information for the one or more stations.

In various embodiments, the apparatus can further include means for transmitting an uplink scheduling message to the one or more stations. The uplink scheduling message can instruct the one or more stations to transmit a station access information message in response to the uplink scheduling message. The apparatus can further include means for receiving a plurality of station access information messages, the station access information messages indicating station access information. In various embodiments, the single-user broadcast message can include data, control, or management information for one or more stations.

Another aspect provides a non-transitory computer-readable medium. The medium includes code that, when executed, causes an apparatus to transmit an aggregated message. The aggregated message includes a single-user broadcast message and at least one other message. The medium further includes code that, when executed, causes the apparatus to transmit the aggregated message to one or more stations.

In various embodiments, each sub-message of the aggregated message can include at least a physical layer data unit (PPDU) comprising a physical layer (PHY) control field and a media access control (MAC) payload. In various embodiments, the at least one other message can include at least one multi-user physical layer data unit (PPDU). In various embodiments, the at least one other message can include at least one single-user physical layer data unit (PPDU) excluding control or scheduling information.

In various embodiments, the aggregated message can include the single-user broadcast message and one or more multi-user messages. In various embodiments, the aggregated message can include a common physical layer header indicating whether the at least one other message includes at least message that all of the one or more stations are instructed to decode. In various embodiments, each message can include a physical layer header indicating whether the at least one other message includes at least message that all of the one or more stations are instructed to decode.

In various embodiments, the single-user broadcast message includes control information instructing the one or more stations to transmit a plurality of uplink data at a specified time. In various embodiments, the medium can further include code that, when executed, causes the apparatus to receive transmission of the plurality of uplink data at the specified time, each transmission of the plurality of uplink data having the same duration. In various embodiments, the medium can further include code that, when executed, causes the apparatus to transmit an acknowledgment message to the one or more stations.

In various embodiments, each message can include an uplink scheduling message. In various embodiments, the uplink scheduling message can include a physical layer data unit (PPDU) duration field indicating a duration of transmission of uplink data. In various embodiments, the uplink scheduling message can include a station access information field including an indication of allowed transmission modes. In various embodiments, the station access information field can include a tone allocation field indicating tones/frequencies for uplink data using a frequency division multiple access (FDMA) system.

In various embodiments, the uplink scheduling message can include a group identifier (GID) field indicating the stations that can participate in uplink communications. In various embodiments, the uplink scheduling message can include a receiver address (RA) field indicating a multicast address which identifies the one or more stations that can participate in uplink communications. In various embodiments, the uplink scheduling message can include a field indicating rate information for the one or more stations.

In various embodiments, the medium can further include code that, when executed, causes the apparatus to transmit an uplink scheduling message to the one or more stations. The uplink scheduling message can instruct the one or more stations to transmit a station access information message in response to the uplink scheduling message. The medium can further include code that, when executed, causes the apparatus to receive a plurality of station access information messages, the station access information messages indicating station access information. In various embodiments, the single-user broadcast message can include data, control, or management information for one or more stations.

BRIEF DESCRIPTION OF THE DRAWINGS

FIG. 21 is a diagram that illustrates one embodiment of an aggregated PPDU (A-PPDU).

FIG. 22 is a transmission and reception time diagram that illustrates one embodiment of an A-PPDU trigger exchange.

FIGS. 23A-23D show time sequence diagrams that illustrate various embodiments of A-PPDU trigger exchanges.

DETAILED DESCRIPTION

Figure 1:
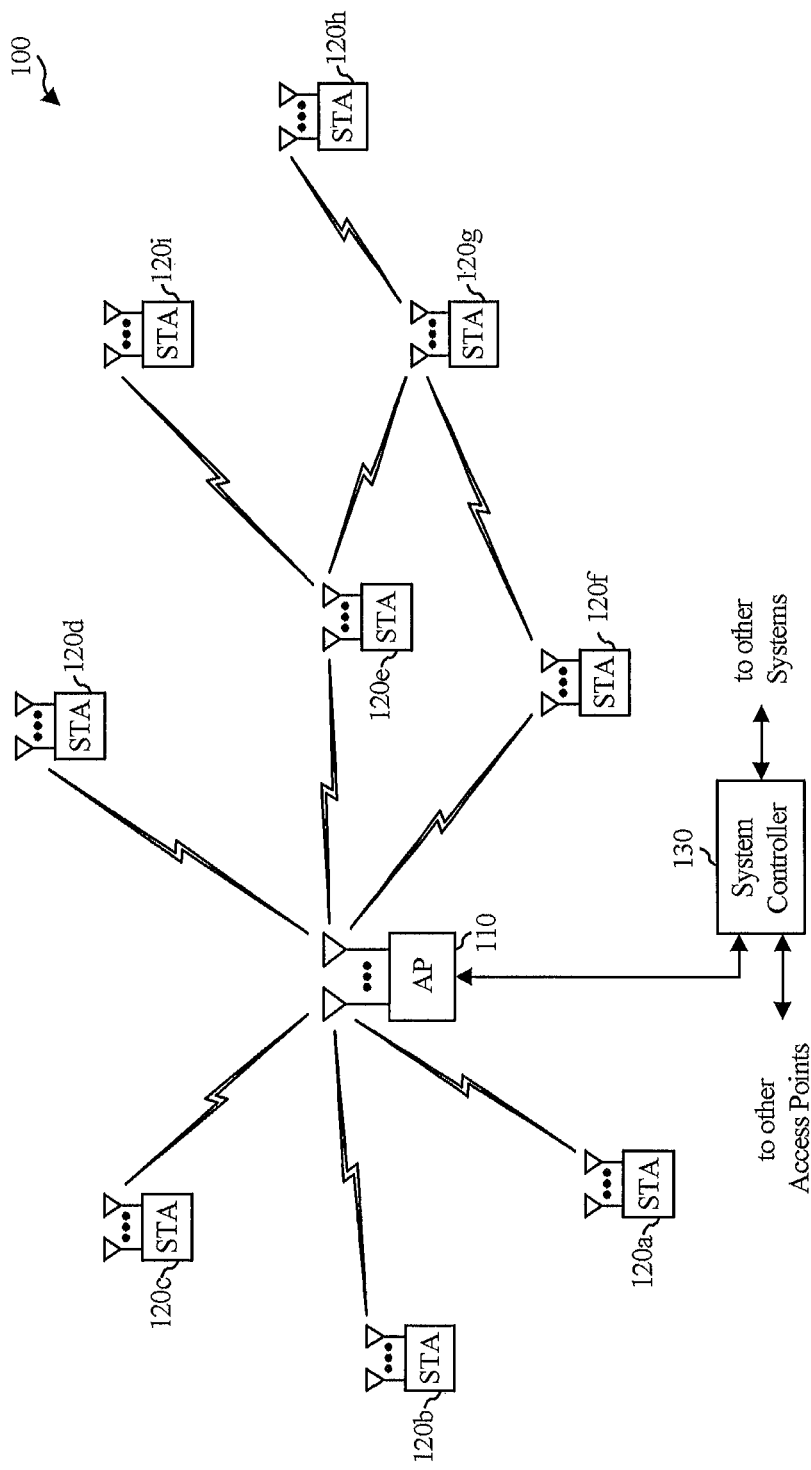
FIG. 1 illustrates a multiple-access multiple-input multiple-output (MIMO) system with access points and STAs.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol can be used for Internet access, sensors, metering, smart grid networks, or other wireless applications. Advantageously, aspects of certain devices implementing this particular wireless protocol can consume less power than devices implementing other wireless protocols, can be used to transmit wireless signals across short distances, and/or can be able to transmit signals less likely to be blocked by objects, such as humans.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and a STA serves as a user of the WLAN. For example, a STA can be a laptop computer, a personal digital assistant (PDA), a mobile phone, etc. In an example, a STA connects to an AP via a Wi-Fi (e.g., IEEE 802.11 protocol such as 802.11ah) compliant wireless link to obtain general connectivity to the Internet or to other wide area networks. In some implementations a STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to simultaneously transmit data belonging to multiple STAs. A TDMA system can allow multiple STAs to share the same frequency channel by dividing the transmission signal into different time slots, each time slot being assigned to different STA. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" can also comprise, be implemented as, or known as a STA, an access terminal ("AT"), a subscriber station, a subscriber unit, a mobile station, a remote station, a remote terminal, a user agent, a user device, user equipment, user terminal, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates wireless communication system 100, configured for multiple-access multiple-input multiple-output (MIMO), with access points and STAs. For simplicity, only one AP 110 is shown in FIG. 1. An access point generally communicates with the STAs and can also be referred to as a base station or other terminology. A STA can be fixed or mobile and can also be referred to as a mobile station or a wireless device, or using some other terminology. The AP 110 can communicate with one or more STAs 120 at any given moment on a downlink and/or uplink. The downlink (i.e., forward link) is the communication link from the access point to the STAs, and the uplink (i.e., reverse link) is the communication link from the STAs to the access point. A STA can also communicate peer-to-peer with another STA. A system controller 130 couples to and provides coordination and control for the access points.

While portions of the following disclosure will describe STAs 120 capable of communicating via Spatial Division Multiple Access (SDMA), for certain aspects, the STAs 120 can also include some STAs that do not support SDMA. Thus, for such aspects, the AP 110 can be configured to communicate with both SDMA and non-SDMA STAs. This approach can conveniently allow older versions of STAs ("legacy" stations) that do not support SDMA to remain deployed in an enterprise, extending their useful lifetime, while allowing newer SDMA STAs to be introduced as deemed appropriate.

The wireless communication system 100 employs multiple transmit and multiple receive antennas for data transmission on the downlink and uplink. The AP 110 is equipped with $N_{ap}$ number of antennas and represents the multiple-input (MI) for downlink transmissions and the multiple-output (MO) for uplink transmissions. A set of K number of selected STAs 120 collectively represents the multiple-output for downlink transmissions and the multiple-input for uplink transmissions. For pure SDMA, it is desired to have $N_{ap} \geq K \geq 1$ if the data symbol streams for the K number of STAs are not multiplexed in code, frequency or time. The value of K can be greater than the value of $N_{ap}$ if the data symbol streams can be multiplexed using TDMA technique, different code channels with CDMA, disjoint sets of sub-bands with OFDM, and so on. Each selected STA can transmit user-specific data to and/or receive user-specific data from the access point. In general, each selected STA can be equipped with one or multiple antennas. The K number of selected STAs can have the same number of antennas, or one or more STAs can have a different number of antennas.

The wireless communication system 100, when configured for SDMA, can be a time division duplex (TDD) system or a frequency division duplex (FDD) system. For a TDD system, the downlink and uplink share the same frequency band. For an FDD system, the downlink and uplink use different frequency bands. The wireless communication system 100 can also utilize a single carrier or multiple carriers for transmission. Each STA can be equipped with a single antenna or multiple antennas. The wireless communication system 100 can also be a TDMA system if the STAs 120 share the same frequency channel by dividing transmission/reception into different time slots, where each time slot can be assigned to a different STA 120.

Figure 2:
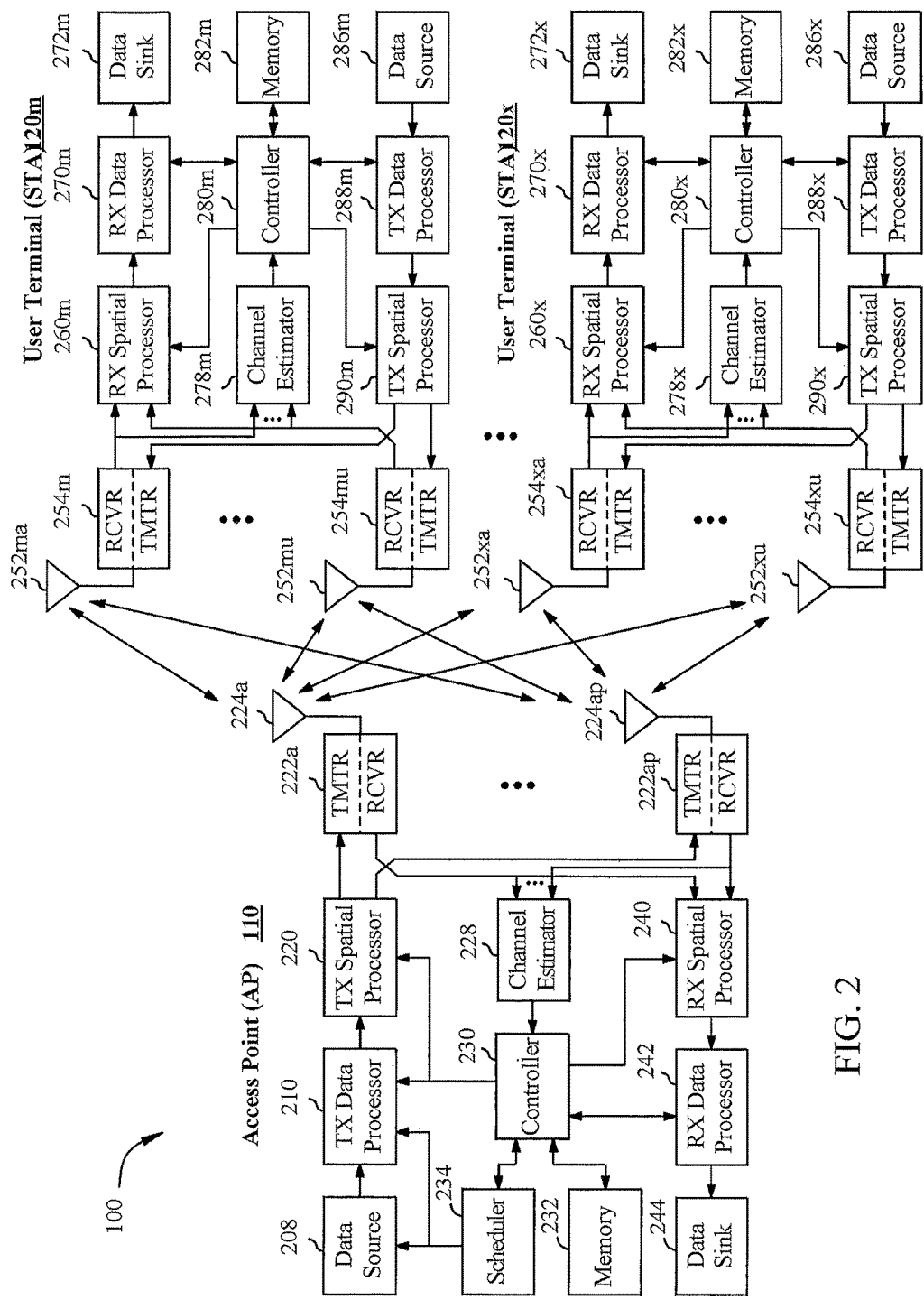
FIG. 2 illustrates a block diagram of the AP 110 and two STAs 120*m* and 120*x* in a MIMO system.

FIG. 2 illustrates a block diagram of the AP 110 and two STAs 120m and 120x in wireless communication system 100. The AP 110 is equipped with $N_t$ number of antennas 224a through 224ap. The STA 120m is equipped with $N_{ut,m}$ number of antennas $252_{ma}$ through $252_{mu}$, and the STA 120x is equipped with $N_{ut,x}$ number of antennas $252_{xa}$ through $252_{xu}$. The AP 110 is a transmitting entity for the downlink and a receiving entity for the uplink. The STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. $N_{up}$ number of STAs are selected for simultaneous transmission on the uplink, and $N_{dn}$ STAs are selected for simultaneous transmission on the downlink. The value of $N_{up}$ may or may not be equal to the value of $N_{dn}$, and the value of $N_{up}$ and the value of $N_{dn}$ can be static values or can change for each scheduled communication interval. Beam-steering or some other spatial processing technique can be used at the AP 110 and/or the STA 120.

On the uplink, at each STA 120 selected for uplink transmission, a TX data processor 288 receives traffic data from a data source 286 and control data from a controller 280. The TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ number of transmit symbol streams for the $N_{ut,m}$ number of antennas. Each transmitter unit (TMTR) 254 receives and processes (e.g., converts to analog, amplifies, filters, and frequency upconverts) a respective transmit symbol stream to generate an uplink signal. $N_{ut,m}$ number of transmitter units 254 provide $N_{ut,m}$ number of uplink signals for transmission from $N_{ut,m}$ number of antennas 252, for example to transmit to the AP 110.

$N_{up}$ number of STAs can be scheduled for simultaneous transmission on the uplink. Each of these STAs can perform spatial processing on its respective data symbol stream and transmit its respective set of transmit symbol streams on the uplink to the AP 110.

At the AP 110, $N_{up}$ number of antennas 224a through $224_{ap}$ receive the uplink signals from all $N_{up}$ number of STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ number of received symbol streams from $N_{up}$ number of receiver units 222 and provides $N_{up}$ number of recovered uplink data symbol streams. The receiver spatial processing can be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA can be provided to a data sink 244 for storage and/or a controller 230 for further processing.

On the downlink, at the AP 110, a TX data processor 210 receives traffic data from a data source 208 for $N_{dn}$ number of STAs scheduled for downlink transmission, control data from a controller 230, and possibly other data from a scheduler 234. The various types of data can be sent on different transport channels. TX data processor 210 processes (e.g., encodes, interleaves, and modulates) the traffic data for each STA based on the rate selected for that STA. The TX data processor 210 provides $N_{dn}$ number of downlink data symbol streams for the $N_{dn}$ number of STAs. A TX spatial processor 220 performs spatial processing (such as a precoding or beamforming) on the $N_{dn}$ number of downlink data symbol streams, and provides $N_{up}$ number of transmit symbol streams for the $N_{up}$ number of antennas. Each transmitter unit 222 receives and processes a respective transmit symbol stream to generate a downlink signal. $N_{up}$ number of transmitter units 222 can provide $N_{up}$ number of downlink signals for transmission from $N_{up}$ number of antennas 224, for example to transmit to the STAs 120.

At each STA 120, $N_{ut,m}$ number of antennas 252 receive the $N_{up}$ number of downlink signals from the AP 110. Each receiver unit 254 processes a received signal from an associated antenna 252 and provides a received symbol stream. An RX spatial processor 260 performs receiver spatial processing on $N_{ut,m}$ number of received symbol streams from $N_{ut,m}$ number of receiver units 254 and provides a recovered downlink data symbol stream for the STA 120. The receiver spatial processing can be performed in accordance with the CCMI, MMSE, or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which can include channel gain estimates, SNR estimates, noise variance and so on. Similarly, a channel estimator 228 estimates the uplink channel response and provides uplink channel estimates. Controller 280 for each STA typically derives the spatial filter matrix for the STA based on the downlink channel response matrix $H_{dn,m}$ for that STA. Controller 230 derives the spatial filter matrix for the access point based on the effective uplink channel response matrix $H_{up,eff}$. The controller 280 for each STA can send feedback information (e.g., the downlink and/or uplink eigenvectors, eigenvalues, SNR estimates, and so on) to the AP 110. The controllers 230 and 280 can also control the operation of various processing units at the AP 110 and STA 120, respectively.

Figure 3:
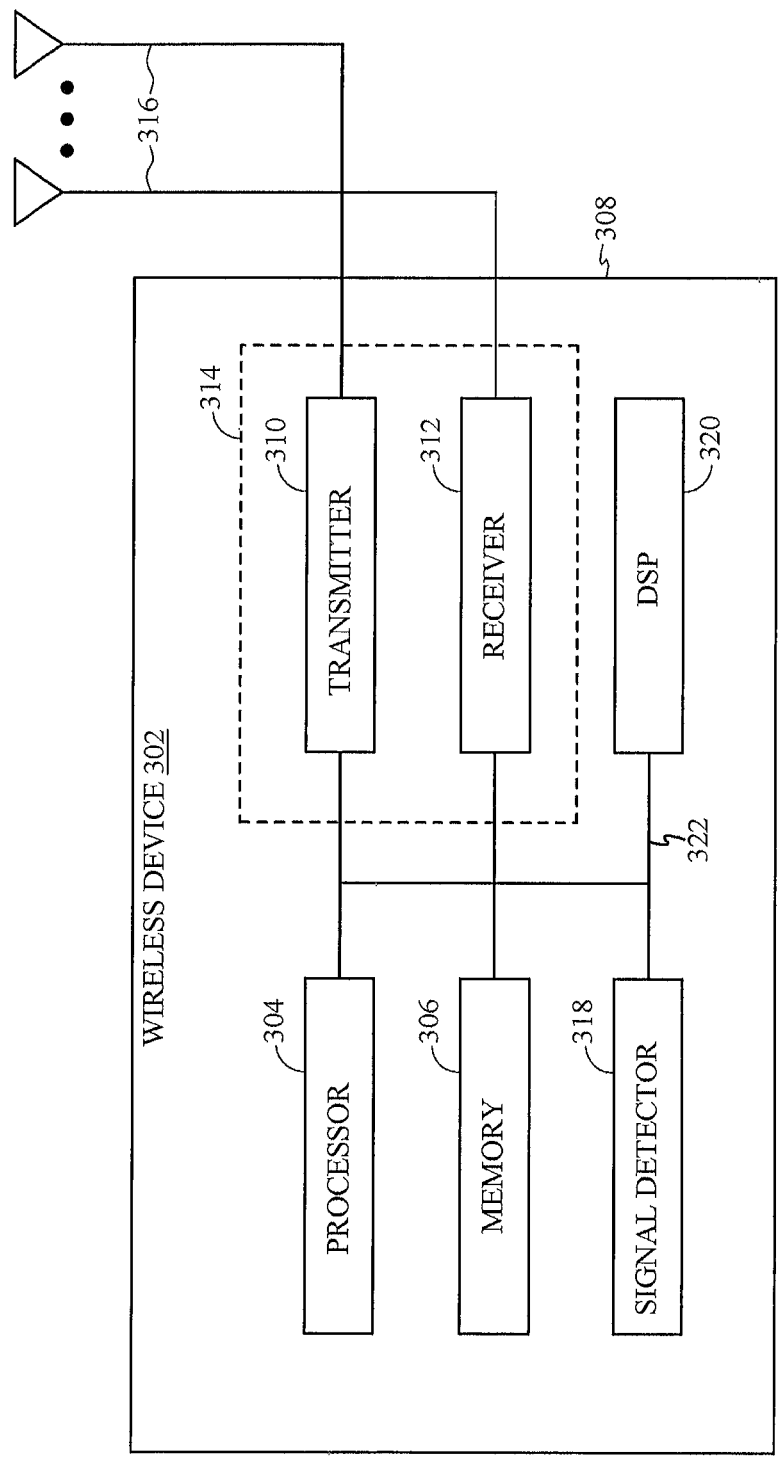
FIG. 3 illustrates various components that can be utilized in a wireless device (such as an access point or a station) that can be employed within the wireless communication system of FIG. 1.

FIG. 3 illustrates various components that can be utilized in a wireless device 302 (such as an access point or a station) that can be employed within the wireless communication system 100 of FIG. 1. The wireless device 302 is an example of a device that can be configured to implement the various methods described herein. The wireless device 302 can implement the AP 110 or a STA 120.

The wireless device 302 can include a processor 304 which controls operation of the wireless device 302. The processor 304 can also be referred to as a central processing unit (CPU). Memory 306, which can include both read-only memory (ROM) and random access memory (RAM), provides instructions and data to the processor 304. A portion of the memory 306 can also include non-volatile random access memory (NVRAM). The processor 304 can perform logical and arithmetic operations based on program instructions stored within the memory 306. The instructions in the memory 306 can be executable to implement the methods described herein.

The processor 304 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 302 can also include a housing 308 that can include a transmitter 310 and a receiver 312 to allow transmission and reception of data between the wireless device 302 and a remote location. The transmitter 310 and receiver 312 can be combined into a transceiver 314. A single or a plurality of transceiver antennas 316 can be attached to the housing 308 and electrically coupled to the transceiver 314. The wireless device 302 can also include multiple transmitters, multiple receivers, and multiple transceivers.

The wireless device 302 can also include a signal detector 318 that can be used in an effort to detect and quantify the level of signals received by the transceiver 314. The signal detector 318 can detect such signals as total energy, energy per subcarrier per symbol, power spectral density and other signals. The wireless device 302 can also include a digital signal processor (DSP) 320 for use in processing signals.

The various components of the wireless device 302 can be coupled together by a bus system 322, which can include a power bus, a control signal bus, and a status signal bus in addition to a data bus.

Certain aspects of the present disclosure support transmitting an uplink (UL) signal from multiple STAs to an AP. In some embodiments, the UL signal can be transmitted in a multi-user MIMO (MU-MIMO) system. Alternatively, the UL signal can be transmitted in a multi-user FDMA (MU-FDMA) or similar FDMA system. Specifically, FIGS. 4-7, 10-11, and 16-20 illustrate UL-MU-MIMO transmissions 410A, 410B, 1050A, and 1050B that would apply equally to UL-FDMA transmissions. In these embodiments, UL-MU-MIMO or UL-FDMA transmissions can be sent simultaneously from multiple STAs to an AP and can create efficiencies in wireless communication.

Figure 4:
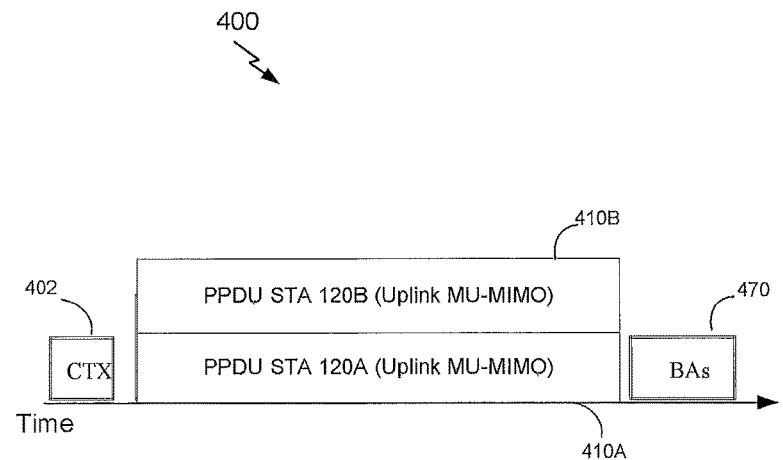
FIG. 4 shows a transmission and reception time diagram of an example of a frame exchange including an uplink (UL) MU-MIMO communication.

FIG. 4 is a transmission and reception time diagram illustrating an example of an UL-MU-MIMO protocol 400 that can be used for UL communications. As shown in FIG. 4 and in conjunction with FIG. 1, the AP 110 can transmit a clear to transmit (CTX) message 402 to the STAs 120 indicating which STAs can participate in the UL-MU-MIMO scheme, such that a particular STA knows to start an UL-MU-MIMO. An example of a CTX frame structure is described more fully below with reference to FIGS. 12-15.

Once a STA 120 receives a CTX message 402 from the AP 110 where the STA is listed, the STA can transmit the UL-MU-MIMO transmission 410. In FIG. 4, STA 120A and STA 120B transmit UL-MU-MIMO transmission 410A and 410B containing physical layer convergence protocol (PLCP) protocol data units (PPDUs). Upon receiving the UL-MU-MIMO transmission 410, the AP 110 can transmit block acknowledgments (BAs) 470 to the STAs 120.

Not all APs or STAs 120 can support UL-MU-MIMO or UL-FDMA operation. A capability indication from a STA 120 can be indicated in a high efficiency wireless (HEW) capability element that is included in an association request or probe request and can include a bit indicating capability, the maximum number of spatial streams a STA 120 can use in a UL-MU-MIMO transmission, the frequencies a STA 120 can use in a UL-FDMA transmission, the minimum and maximum power and granularity in the power backoff, and the minimum and maximum time adjustment a STA 120 can perform.

A capability indication from an AP can be indicated in a HEW capability element that is included in an association response, beacon or probe response and can include a bit indicating capability, the maximum number of spatial streams a single STA 120 can use in a UL-MU-MIMO transmission, the frequencies a single STA 120 can use in a UL-FDMA transmission, the required power control granularity, and the required minimum and maximum time adjustment a STA 120 should be able to perform.

In one embodiment, capable STAs 120 can request to a capable AP to be part of the UL-MU-MIMO (or UL-FDMA) protocol by sending a management frame to AP indicating request for enablement of the use of UL-MU-MIMO feature. In one aspect, the AP 110 can respond by granting the use of the UL-MU-MIMO feature or denying it. Once the use of the UL-MU-MIMO is granted, the STA 120 can expect a CTX message 402 at a variety of times. Additionally, once a STA 120 is enabled to operate the UL-MU-MIMO feature, the STA 120 can be subject to follow a certain operation mode. If multiple operation modes are possible, an AP can indicate to the STA 120 which mode to use in a HEW capability element or in an operation element. In one aspect the STAs 120 can change the operation modes and parameters dynamically during operation by sending a different operating element to the AP 110. In another aspect the AP 110 can switch operation modes dynamically during operation by sending an updated operating element to a STA 120 or in a beacon. In another aspect, the operation modes can be indicated in the setup phase and can be setup per STA 120 or for a group of STAs 120. In another aspect the operation mode can be specified per traffic identifier (TID).

Figure 5:
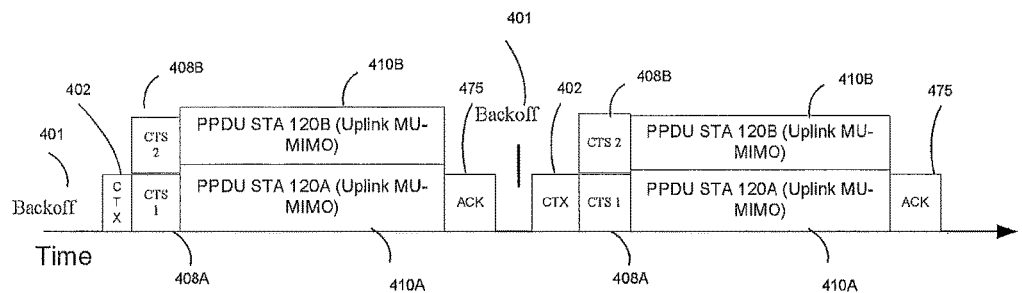
FIG. 5 shows a transmission and reception time diagram of another example of a frame exchange of an UL-MU-MIMO communication.

FIG. 5 is a transmission and reception time diagram that, in conjunction with FIG. 1, illustrates an example of an operation mode of a UL-MU-MIMO transmission. In this embodiment, a STA 120 receives a CTX message 402 from the AP 110 and sends an immediate response to the AP 110. The response can be in the form of a clear to send (CTS) 408 or another similar signal. In one aspect, requirement to send a CTS can be indicated in the CTX message 402 or can be indicated in the setup phase of the communication. As shown in FIG. 5, STA 120A and STA 120B can transmit a CTS 1 408A and CTS 2 408B message in response to receiving the CTX message 402. The modulation and coding scheme (MCS) of the CTS 1 408A and CTS 2 408B can be based on the MCS of the CTX message 402. In this embodiment, CTS 1 408A and CTS 2 408B contain the same bits and the same scrambling sequence so that they can be transmitted to the AP 110 at the same time. The duration field of the CTS 408 signals can be based on the duration field in the CTX by removing the time for the CTX PPDU. The UL-MU-MIMO transmission 410A and 410B are then sent by the STAs 120A and 120B as listed in the CTX 402 signals. The AP 110 can then send acknowledgment (ACK) signals the STAs 120A and 120B. In some aspects, the ACK signals can be serial ACK signals to each station or BAs. In some aspects the ACKs can be polled. This embodiment creates efficiencies by simultaneously transmitting CTS 408 signals from multiple STAs to the AP 110 instead of sequentially, which saves time and reduces the possibility of interference.

Figure 6:
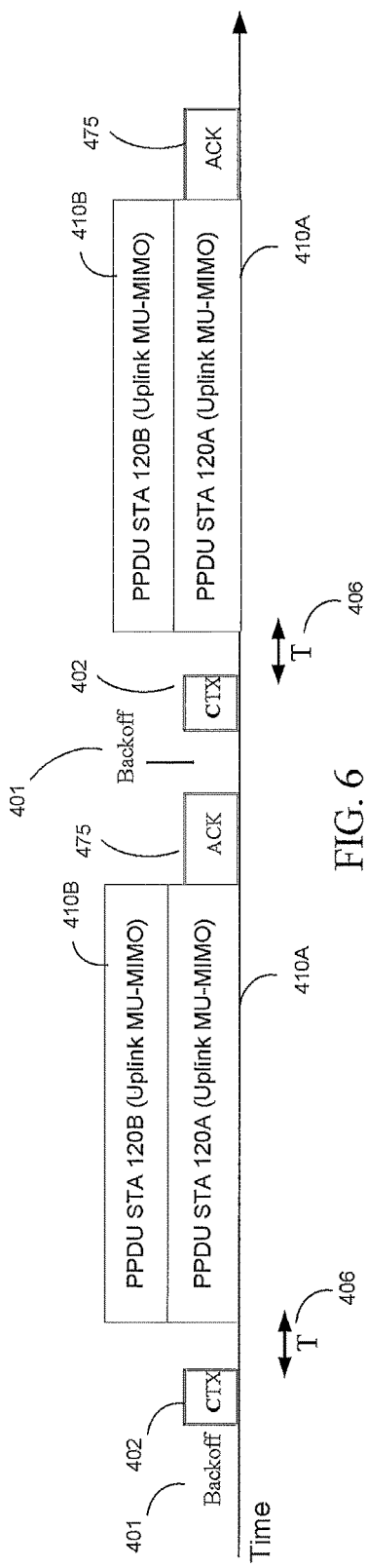
FIG. 6 shows a transmission and reception time diagram of another example of a frame exchange of an UL-MU-MIMO communication.

FIG. 6 is a transmission and reception time diagram that, in conjunction with FIG. 1, illustrates another example of an operation mode of a UL-MU-MIMO transmission. In this embodiment, STAs 120A and 120B receive a CTX message 402 from the AP 110 and are allowed to start and UL-MU-MIMO transmission a time (T) 406 after the end of the PPDU carrying the CTX message 402. The time T 406 can be a short interframe space (SIFS), point interframe space (PIFS), or another time potentially adjusted with additional offsets as indicated by the AP 110 in the CTX message 402 or via a management frame. The SIFS and PIFS time can be fixed in a standard or indicated by the AP 110 in the CTX message 402 or in a management frame. One advantage of specifying the time T 406 can be to improve synchronization or to allow a STAs 120A and 120B time to process the CTX message 402 or other messages before transmission.

Referring to FIGS. 4-6, in conjunction with FIG. 1, the UL-MU-MIMO transmission 410 can have the same duration as other UL-MU-MIMO transmissions. The duration of the UL-MU-MIMO transmission 410 for STAs utilizing the UL-MU-MIMO feature can be indicated in the CTX message 402 or during the setup phase. To generate a PPDU of the required duration, a STA 120 can build a PLCP service data unit (PSDU) so that the length of the PPDU matches the length indicated in the CTX message 402. In another aspect, a STA 120 can adjust the level of data aggregation in a media access control (MAC) protocol data unit (A-MPDU) or the level of data aggregation in a MAC service data units (A-MSDU) to approach the target length. In another aspect, a STA 120 can add end of file (EOF) padding delimiters to reach the target length. In another approach the padding or the EOF pad fields are added at the beginning of the A-MPDU. One of the benefits of having all the UL-MU-MIMO transmissions the same length is that the power level of the transmission will remain constant.

In some embodiments, a STA 120 can have data to upload to the AP but the STA 120 has not received a CTX message 402 or other signal indicating that the STA 120 can start a UL-MU-MIMO transmission.

Figure 7:
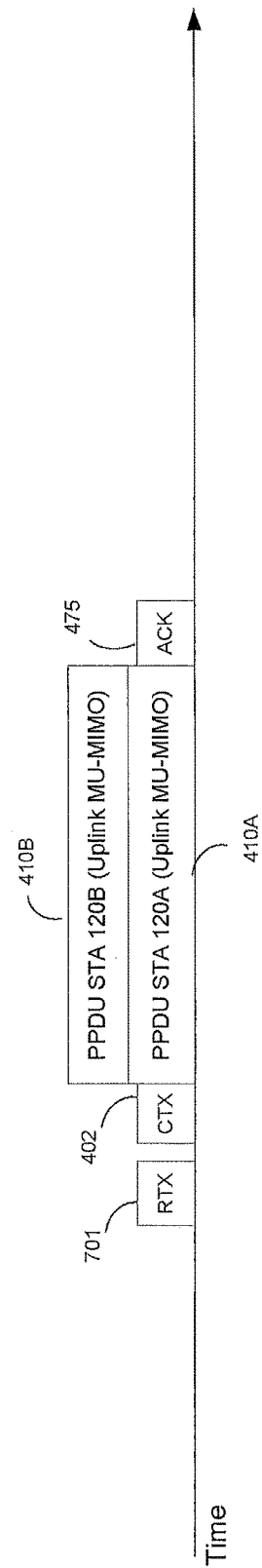
FIG. 7 shows a transmission and reception time diagram of another example of a frame exchange of an UL-MU-MIMO communication.

In one operation mode, the STAs 120 are not allowed to transmit outside an UL-MU-MIMO transmission opportunity (TXOP) (e.g., after CTX message 402). In another operation mode STAs 120 can transmit frames to initialize a UL-MU-MIMO transmission, and then can transmit during the UL-MU-MIMO TXOP, if for example, they are instructed to do so in a CTX message 402. In one embodiment, the frame to initialize a UL-MU-MIMO transmission can be a request to transmit (RTX), a frame specifically designed for this purpose (an example of a RTX frame structure is described more fully below with reference to FIGS. 8 and 9). The RTX frames can be the only frames a STA 120 is allowed to use to initiate a UL MU MIMO TXOP. In one embodiment, the STA may not transmit outside an UL-MU-MIMO TXOP other than by sending an RTX. In another embodiment, a frame to initialize an UL MU MIMO transmission can be any frame which indicates to the AP 110 that a STA 120 has data to send. It can be pre-negotiated that these frames indicate a UL MU MIMO TXOP request. For example, the following can be used to indicate that a STA 120 has data to send and is requesting an UL MU MIMO TXOP: an RTS, a data frame or QoS Null frame with bits 8-15 of the QoS control frame set to indicate more data, or a PS poll. In one embodiment, the STA may not transmit outside an UL MU MIMO TXOP other than by sending frames to trigger this TXOP, where this frame can be an RTS, PS poll, or QOS null. In another embodiment, the STA can send single user uplink data as usual, and can indicate a request for a UL MU MIMO TXOP by setting bits in the QoS control frame of its data packet. FIG. 7 is a transmission and reception time diagram illustrating, in conjunction with FIG. 1, an example where the frame to initialize a UL-MU-MIMO is a RTX 701. In this embodiment the STA 120 sends to the AP 110 a RTX 701 that includes information regarding the UL-MU-MIMO transmission. As shown in FIG. 7, the AP 110 can respond to the RTX 701 with a CTX message 402 granting an UL-MU-MIMO TXOP to send the UL-MU-MIMO transmission 410 immediately following the CTX message 402. In another aspect, the AP 110 can respond with a CTS that grants a single-user (SU) UL TXOP. In another aspect, the AP 110 can respond with a frame (e.g., ACK or CTX with a special indication) that acknowledges the reception of the RTX 701 but does not grant an immediate UL-MU-MIMO TXOP. In another aspect, the AP 110 can respond with a frame that acknowledges the reception of the RTX 701, does not grant an immediate UL-MU-MIMO TXOP, but grants a delayed UL-MU-MIMO TXOP and can identify the time of the TXOP is granted. In this embodiment, the AP 110 can send a CTX message 402 to start the UL-MU-MIMO at the granted time.

In another aspect, the AP 110 can respond to the RTX 701 with an ACK or other response signal which does not grant the STA 120 an UL-MU-MIMO transmission but indicates that the STA 120 shall wait for a time (T) before attempting another transmission (e.g., sending another RTX). In this aspect the time (T) can be indicated by the AP 110 in the setup phase or in the response signal. In another aspect the AP 110 and a STA 120 can agree on a time which the STA 120 can transmit a RTX 701, RTS, PS-poll, or any other request for a UL-MU-MIMO TXOP.

In another operation mode, STAs 120 can transmit requests for UL-MU-MIMO transmissions 410 in accordance with regular contention protocol. In another aspect, the contention parameters for STAs 120 using UL-MU-MIMO are set to a different value than for other STAs that are not using the UL-MU-MIMO feature. In this embodiment, the AP 110 can indicate the value of the contention parameters in a beacon, association response or through a management frame. In another aspect, the AP 110 can provide a delay timer that prevents a STA 120 from transmitting for a certain amount of time after each successful UL-MU-MIMO TXOP or after each RTX, RTS, PS-poll, or QoS null frame. The timer can be restarted after each successful UL-MU-MIMO TXOP. In one aspect, the AP 110 can indicate the delay timer to STAs 120 in the setup phase or the delay timer can be different for each STA 120. In another aspect, the AP 110 can indicate the delay timer in the CTX message 402 or the delay timer can be dependent on the order of the STAs 120 in the CTX message 402, and can be different for each terminal.

In another operational mode, the AP 110 can indicate a time interval during which the STAs 120 are allowed to transmit a UL-MU-MIMO transmission. In one aspect, the AP 110 indicates a time interval to the STAs 120 during which the STAs are allowed to send a RTX or RTS or other request to the AP 110 to ask for an UL-MU-MIMO transmission. In this aspect, the STAs 120 can use regular contention protocol. In another aspect, the STAs may not initiate a UL-MU-MIMO transmission during the time interval but the AP 110 can send a CTX or other message to the STAs to initiate the UL-MU-MIMO transmission.

In certain embodiments, a STA 120 enabled for UL-MU-MIMO can indicate to the AP 110 that it requests an UL-MU-MIMO TXOP because it has data pending for UL. In one aspect, the STA 120 can send a RTS or a PS-poll to request a UL-MU-MIMO TXOP. In another embodiment, the STA 120 can send any data frame, including a quality of service (QoS) null data frame, where the bits 8-15 of the QoS control field indicate a non-empty queue. In this embodiment the STA 120 can determine during the setup phase which data frames (e.g., RTS, PS-poll, QoS null, etc.) will trigger a UL-MU-MIMO transmission when the bits 8-15 of the QoS control field indicate a non-empty queue. In one embodiment, the RTS, PS-poll, or QoS null frames can include a 1 bit indication allowing or disallowing the AP 110 to respond with a CTX message 402. In another embodiment, the QoS null frame can include TX power information and a per TID queue information. The TX power information and per TID queue information can be inserted in the two bytes of the sequence control and QoS controls fields in a QoS null frame and the modified QoS null frame can be sent to the AP 110 to request a UL-MU-MIMO TXOP. In another embodiment, referring to FIGS. 1 and 7, the STA 120 can send a RTX 701 to request a UL-MU-MIMO TXOP.

In response to receiving an RTS, RTX, PS-poll or QoS null frame, or other trigger frame as described above, the AP 110 can send a CTX message 402. In one embodiment, referring to FIG. 7, after the transmission of the CTX message 402 and the completion of the UL-MU-MIMO transmissions 410A and 410B, the TXOP returns to the STAs 120A and 120B which can decide on how to use the remaining TXOP. In another embodiment, referring to FIG. 7, after the transmission of the CTX message 402 and the completion of the UL-MU-MIMO transmissions 410A and 410B, TXOP remains with the AP 110 and the AP110 can use the remaining TXOP for additional UL-MU-MIMO transmissions by sending another CTX message 402 to either STAs 120A and 120B or to other STAs.

Figure 8:
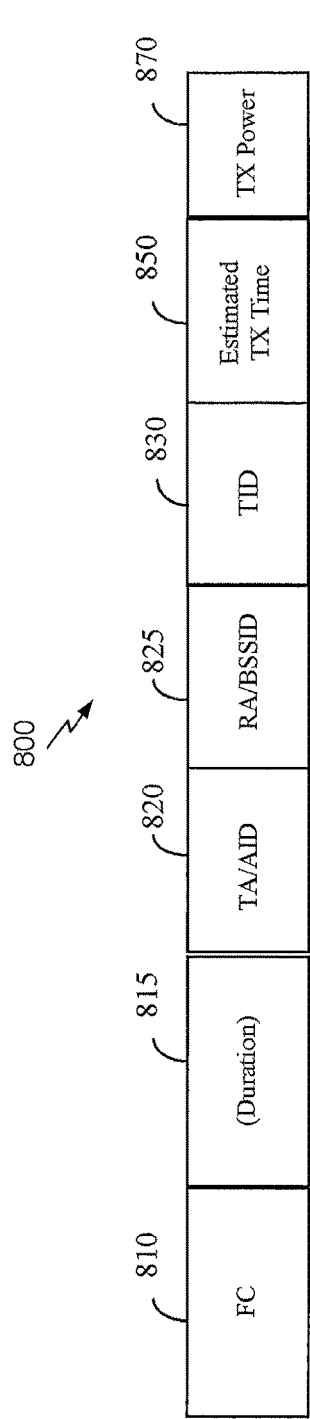
FIG. 8 shows a diagram of one embodiment of a request to transmit (RTX) frame.

FIG. 8 is a diagram of one embodiment of a RTX frame 800. The RTX frame 800 includes a frame control (FC) field 810, a duration field 815 (optional), a transmitter address (TA)/allocation identifier (AID) field 820, a receiver address (RA)/basic service set identifier (BSSID) field 825, a TID field 830, an estimated transmission (TX) time field 850, and a TX power field 870. The FC field 810 indicates a control subtype or an extension subtype. The duration field 815 indicates to any receiver of the RTX frame 800 to set the network allocation vector (NAV). In one aspect, the RTX frame 800 may not have a duration field 815. The TA/AID field 820 indicates the source address which can be an AID or a full MAC address. The RA/BSSID field 825 indicates the RA or BSSID. In one aspect the RTX frame may not contain a RA/BSSID field 825. The TID field 830 indicates the access category (AC) for which the user has data. The Estimated TX time field 850 indicates the time requested for the UL-TXOP and can be the time required for a STA 120 to send all the data in its buffer at the current planned MCS. The TX power field 870 indicates the power at which the frame is being transmitted and can be used by the AP to estimate the link quality and adapt the power backoff indication in a CTX frame.

Figure 9:
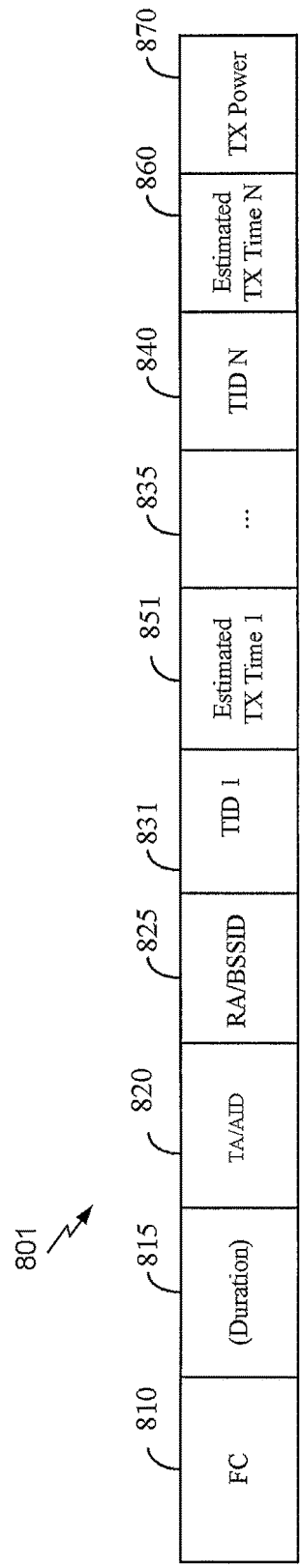
FIG. 9 shows a diagram of another embodiment of a RTX frame.

FIG. 9 is a diagram of another embodiment of a RTX frame 801. In this embodiment, the RTX frame 801 contains a TID field and an Estimated TX time field for each access class listed in the RTX 801 frame (TID fields 831 and 840 and Estimated TX time fields 851, 860).

Before an UL-MU-MIMO communication is allowed to take place, the AP 110 can collect information from the STAs 120 that can participate in the UL-MU-MIMO communication. The AP 110 can optimize the collection of information from the STAs 120 by scheduling the transmissions from the STAs 120.

In one embodiment, the AP 110 can use a station scheduling frame (SSF) to schedule the transmission of multiple station access information frames (SIFs) from STAs 120. The SSF frame can be a short frame to allow for faster communication to trigger a response from the STAs. The SSF can be a CTX message 402 or another message indicating the STAs 120 send a SIF. In general, station access information can include any information regarding a STA, for example information on how, when, or if the STA should access the AP. For example, the SIF can contain information indicating that the STAs 120 have data, how much data they have, and what type of data (i.e. what access class). It can also include the transmit power that is being used to send that SIF. In one embodiment, the SIF is a null data packet (NDP).

Figure 10:
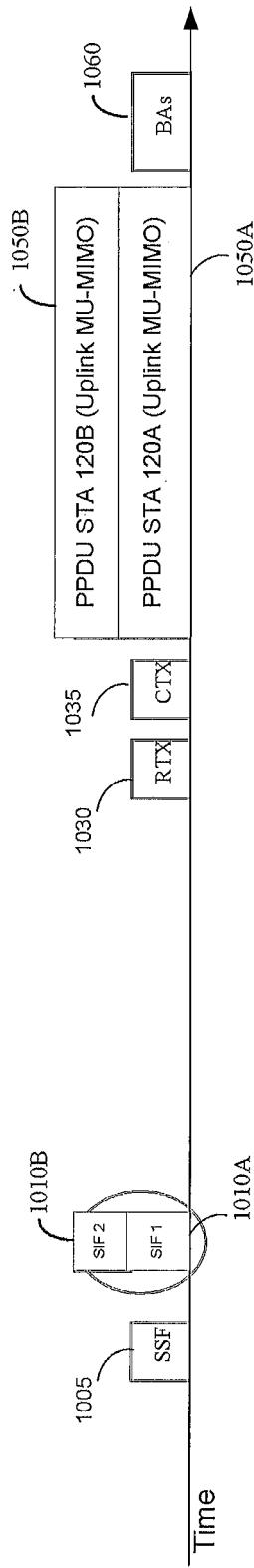
FIG. 10 shows a transmission and reception time diagram of an example of a frame exchange including a station scheduling frame (SSF) and a station access information frame (SIF).

The SIF/SSF exchange can be optimized by using a TDMA, FDMA, SDMA, OFDMA, UL-MU-MIMO, or any other communication system that is based on an orthogonal multiplexing scheme. FIG. 10 is a transmission and reception time diagram illustrating an example of a SSF/SIF exchange in a FDMA system. In this embodiment, the SSF 1005 contains a list of STAs 120 to send SIFs 1010 to the AP 110. The SSF 1005 can also contain power adjustment information to control the power of the FDMA transmission 1010 signals. The SIFs 1010A and 1010B as well as the maximum number of TID information blocks allowed in a SIF 1010 can be prenegotiated so that the SIF response is always a fixed time duration. Alternatively the amount of time for the SIF 1010 response can be prenegotiated. The amount of time for the SIF 1010 response can also be included in the SSF 1005. When the response time is known, the STAs 120 would be allowed to send at higher MCSs and therefore send more TIDs. The frequency allocation based on the STA 120 order in the SSF can also be prenegotiated to determine which STA 120 gets which 20 MHz block for communication.

Figure 11:
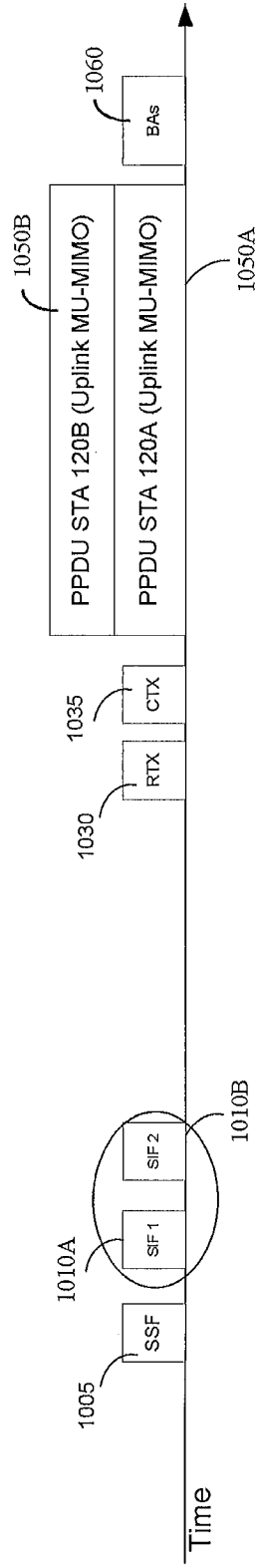
FIG. 11 shows a transmission and reception time diagram of another example of a frame exchange including a station scheduling frame (SSF) and a station access information frame (SIF).

FIG. 11 is a transmission and reception time diagram illustrating an example of a SSF/SIF exchange in a TDMA system. In this embodiment, the SSF 1005 contains a list of STAs 120 to send SIFs 1010 to the AP 110. In this embodiment, SIFs 1010A and 1010B are sent sequentially by the STAs 120A and 120B, respectively. The MCS of the SIFs 1010A and 1010B, as well as the maximum number of TIDs allowed in a SIF 1010 can be prenegotiated to determine the time of each SIF 1010. For example, if a STA 120 has less than the maximum number of TIDs to fill out, the STA 120 can fill the remaining TIDs with padding so that all the SIFs are the same length. Alternatively the amount of time for the SIF 1010 response can be prenegotiated. The amount of time for the SIF 1010 response can also be included in the SSF 1005. When the response time is known, the STAs 120 would be allowed to send at higher MCSs and therefore send more TID information blocks.

In another embodiment, the SSF/SIF exchange can take place in OFDMA system. In this embodiment, the SSF 1005 contains the total number of STAs 120 being asked to send SIFs 1010 and a list of STAs 120 to send SIFs 1010 to the AP 110. The SSF 1005 can also contain power adjustment information to control the power of the SIF transmission 1010 signals. In this embodiment, the MCS of the SIFs 1010, and number of TID information blocks in the SIF 1010 can be prenegotiated. Alternatively, the amount of time for the SIF 1010 response can also be included in the SSF 1005 or prenegotiated. When the response time is known by the STAs 120, the STAs 120 would be allowed to send at higher MCSs and therefore send more TIDs. In one aspect, the mapping of the STAs 120 order to subcarriers can be prenegotiated and would be a function of the number of STAs 120 being asked to send a SIF 1010.

In another embodiment, the SSF/SIF exchange can take place in a UL-MU-MIMO system. In this embodiment, the SSF 1005 contains a list of STAs 120 to send SIFs 1010 to the AP 110. The SSF 1005 can also contain power adjustment information to control the power of the SIF transmission 1010 signals. In this embodiment, the MCS of the SIFs 1010 can be prenegotiated. In one aspect, the mapping of the STAs 120 order to spatial streams can be prenegotiated and would be a function of the number of STAs 120 being asked to send a SIF 1010. Additionally, the maximum number of TIDs allowed in a SIF 1010 and the amount of time for the SIF 1010 response can be prenegotiated. Alternatively, the amount of time for the SIF 1010 response can also be included in the SIF 1010, or prenegogiated. When the response time is known by the STAs 120, the STAs 120 would be allowed to send at higher MCSs and therefore send more TIDs.

Figure 12:
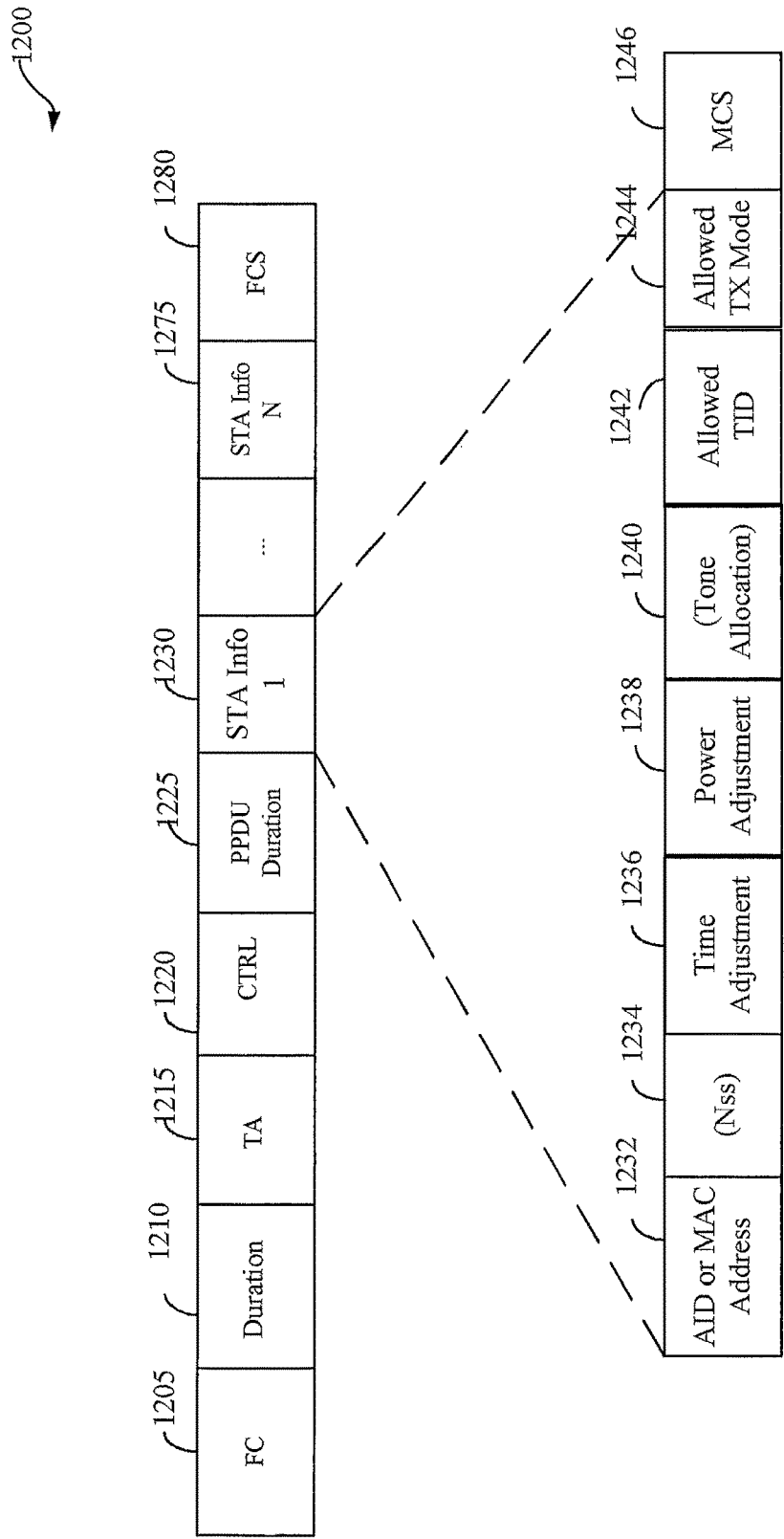
FIG. 12 shows a diagram of one embodiment of a clear to transmit (CTX) frame.

As discussed above, the CTX message 402 can be used in a variety of communications. FIG. 12 is a diagram of an example of a CTX frame 1200 structure. In this embodiment, the CTX frame 1200 is a control frame that includes a frame control (FC) field 1205, a duration field 1210, a transmitter address (TA) field 1215, a control (CTRL) field 1220, a PPDU duration field 1225, a STA info field 1230, and a frame check sequence (FCS) field 1280. The FC field 1205 indicates a control subtype or an extension subtype. The duration field 1210 indicates to any receiver of the CTX frame 1200 to set the network allocation vector (NAV). The TA field 1215 indicates the transmitter address or a BSSID. The CTRL field 1220 is, in general, a field that can include information regarding the format of the remaining portion of the frame (e.g., the number of STA info fields and the presence or absence of any subfields within a STA info field), indications for rate adaptation for the STAs 120, indication of allowed TID, and indication that a CTS must be sent immediately following the CTX frame 1200. The CTRL field 1220 can also indicate if the CTX frame 1200 is being used for UL MU MIMO or for UL FDMA or both, indicating whether a Nss or Tone allocation field is present in the STA Info field 1230. Alternatively, the indication of whether the CTX is for UL MU MIMO or for UL FDMA can be based on the value of the subtype. Note that UL MU MIMO and UL FDMA operations can be jointly performed by specifying to a STA both the spatial streams to be used and the channel to be used, in which case both fields are present in the CTX; in this case, the Nss indication is referred to a specific tone allocation. The PPDU duration 1225 field indicates the duration of the following UL-MU-MIMO PPDU that the STAs 120 are allowed to send. The STA Info 1230 field contains information regarding a particular STA and can include a per-STA (per STA 120) set of information (see STA Info 1 1230 and STA Info N 1275). The STA Info 1230 field can include an AID or MAC address field 1232 which identifies a STA, a number of spatial streams field (Nss) 1234 field which indicates the number of spatial streams a STA can use (in an UL-MU-MIMO system), a Time Adjustment 1236 field which indicates a time that a STA should adjust its transmission compared to the reception of a trigger frame (the CTX in this case), a Power Adjustment 1238 field which indicates a power backoff a STA should take from a declared transmit power, a Tone Allocation 1240 field which indicates the tones or frequencies a STA can use (in a UL-FDMA system), an Allowed TID 1242 field which indicates the allowable TID, an Allowed TX Mode 1244 field which indicates the allowed TX modes, and a MCS 1246 field which indicates the MCS the STA should use. A STA 120 receiving a CTX with an AllowedTID 1242 indication can be allowed to transmit data only of that TID, data of the same or higher TID, data of the same or lower TID, any data, or only data of that TID first, then if no data is available, data of other TIDs. The FCS 1280 field indicates the carries an FCS value used for error detection of the CTX frame 1200.

Figure 13:
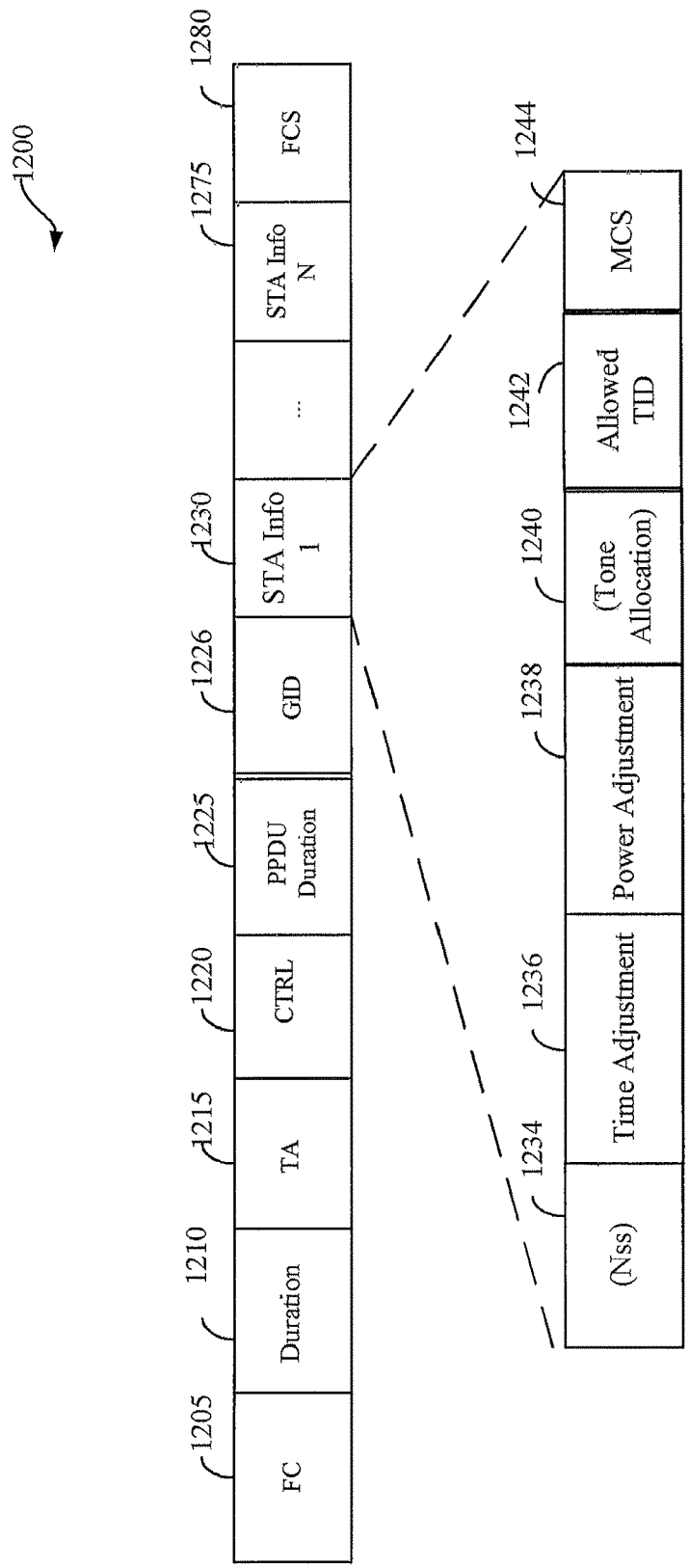
FIG. 13 shows a diagram of another embodiment of a CTX frame.
Figure 14:
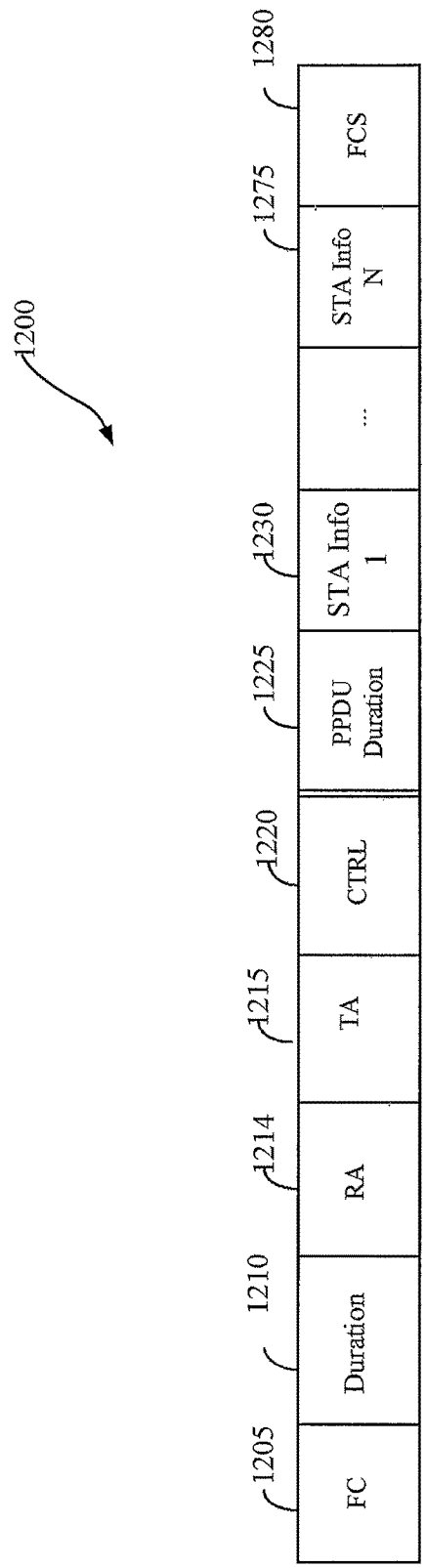
FIG. 14 shows a diagram of another embodiment of a CTX frame.

FIG. 13 is a diagram of another example of a CTX frame 1200 structure. In this embodiment and in conjunction with FIG. 12, the STA Info 1230 field does not contain the AID or MAC Address 1232 field and instead the CTX frame 1200 includes a group identifier (GID) 1226 field which identifies the one or more stations by a group identifier rather than an individual identifier. FIG. 14 is a diagram of another example of a CTX frame 1200 structure. In this embodiment and in conjunction with FIG. 13, the GID 1226 field is replaced with a RA 1214 field which identifies a group of STAs through a multicast MAC address.

Figure 15:
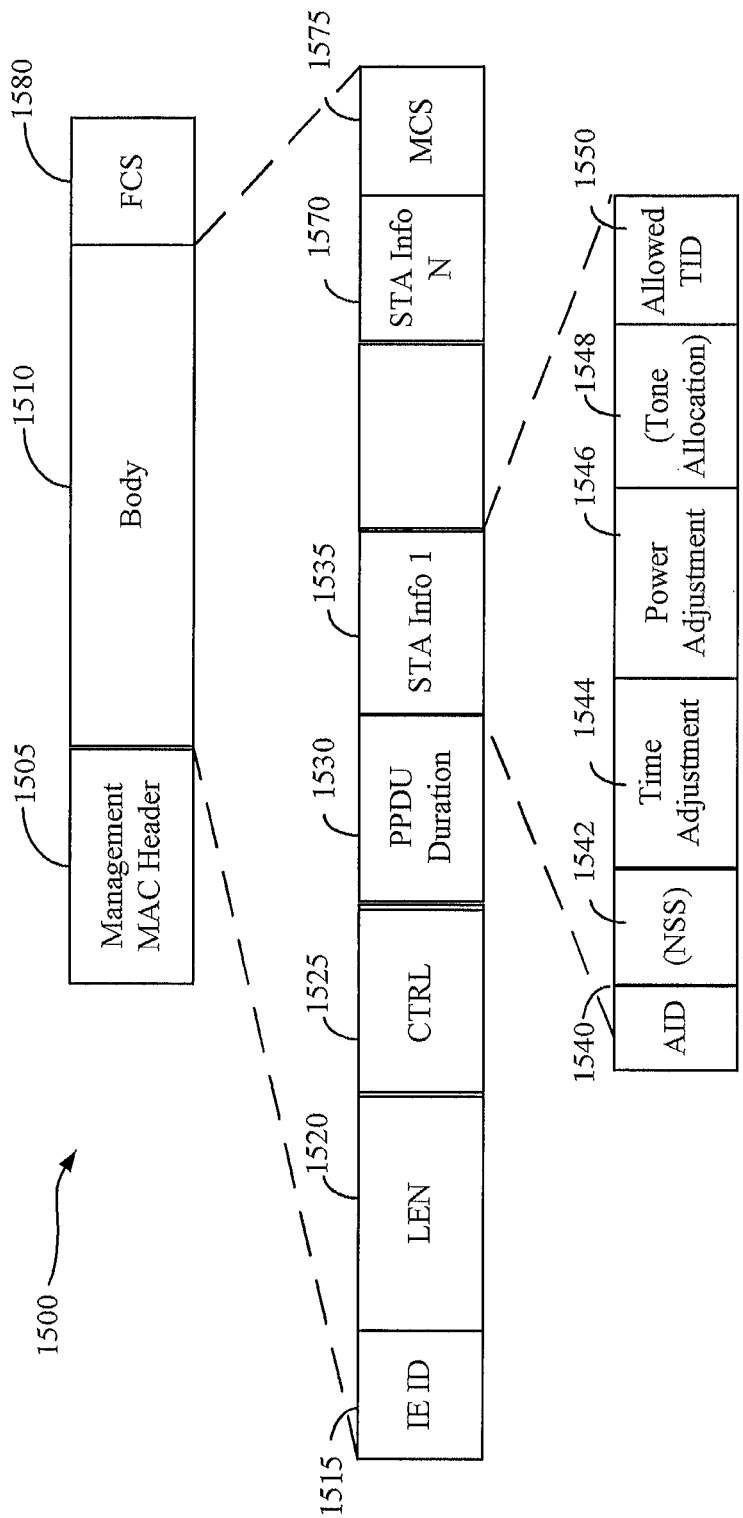
FIG. 15 shows a diagram of another embodiment of a CTX frame.

FIG. 15 is a diagram of an example of a CTX 1500 frame structure. In this embodiment, the CTX 1500 frame is a management frame that includes a Management MAC Header 1505 field, a Body 1510 field, and a FCS 1580 field. The Body 1510 field includes an IE ID 1515 field which identifies an information element (IE), a LEN 1520 field which indicates the length of the CTX 1500 frame, a CTRL 1525 field which includes the same information as the CTRL 1220 field, a PPDU Duration 1530 field which indicates the duration of the following UL-MU-MIMO PPDU that the STAs 120 are allowed to send, a STA Info 1 1535 field and a MCS 1575 field which can indicate the MCS for all the STAs to use in the following UL-MU-MIMO transmission, or an MCS backoff for all the STAs to use in the following UL-MU-MIMO transmission. The STA Info 1 1535 (along with STA Info N 1570) field represent a per STA field that includes AID 1540 field which identifies a STA, a number of spatial streams field (Nss) 1542 field which indicates the number of spatial streams a STA can use (in an UL-MU-MIMO system), a Time Adjustment 1544 field which indicates a time that a STA should adjust its transmission compared to the reception of a trigger frame (the CTX in this case), a Power Adjustment 1546 field which indicates a power backoff a STA should take from a declared transmit power, a Tone Allocation 1548 field which indicates the tones or frequencies a STA can use (in a UL-FDMA system), and an Allowed TID 1550 field which indicates the allowable TID.

In one embodiment, the CTX frame 1200 or the CTX 1500 frame can be aggregated in an A-MPDU to provide time to a STA 120 for processing before transmitting the UL signals. In this embodiment, padding or data can be added after the CTX to allow a STA 120 additional time to process the forthcoming packet. One benefit to padding a CTX frame can be to avoid possible contention issues for the UL signals from other STAs 120. In one aspect, if the CTX is a management frame, additional padding IEs can be sent. In another aspect the STAs 120 can request to the AP 110 a minimum duration or padding for the CTX frame.

In some embodiments, the AP 110 can initiate a CTX transmission. In one embodiment, the AP 110 can send a CTX message 402 in accordance with regular enhanced distribution channel access (EDCA) contention protocol. In another embodiment, the AP 110 can send a CTX message 402 at scheduled times. In this embodiment, the scheduled times can be indicated by the AP 110 to the STAs 120 by using a restricted access window (RAW) indication in a beacon which indicates a time reserved for a group of STAs 120 to access the medium, a target wake time (TWT) agreement with each STA 120 which indicates to multiple STAs 120 to be awake at the same time to take part in a UL-MU-MIMO transmission, or information in other fields. Outside the RAW and TWT a STA 102 can be allowed to transmit any frame, or only a subset of frames (e.g., non-data frames). It can also be forbidden to transmit certain frames (e.g., it can be forbidden to transmit data frames). The STA 120 can also indicate that it is in sleep state. One advantage to scheduling a CTX is that multiple STAs 120 can be indicated for the same TWT or RAW time and can receive a transmission from the AP 110.

Figure 16:
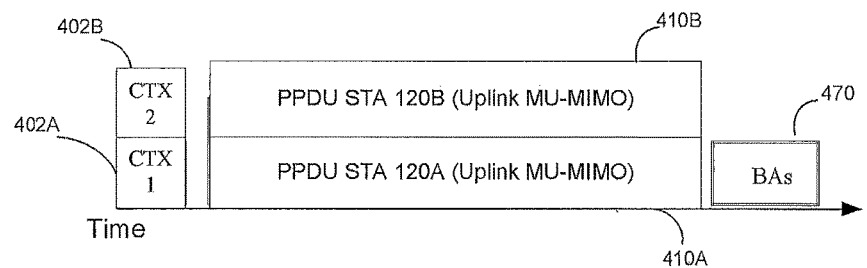
FIG. 16 shows a transmission and reception time diagram of another example of a frame exchange of an UL-MU-MIMO communication.
Figure 17:
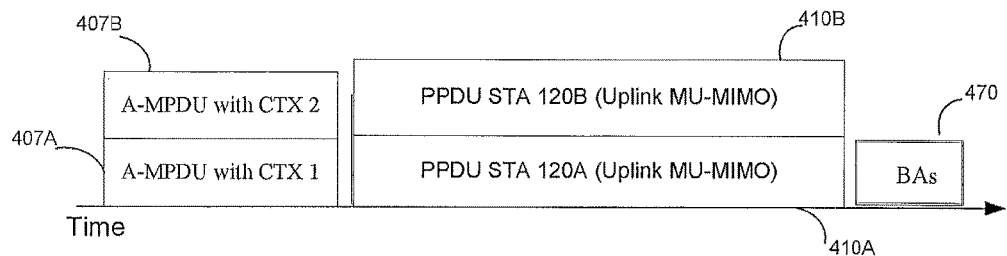
FIG. 17 shows another example of a frame exchange of an UL-MU-MIMO communication.

In one embodiment, a CTX message 402 can include information for a single STA 120. In this embodiment, the AP 110 can send multiple CTX messages 402 that include information for one STA 120 at the same time to multiple STAs 120, creating a schedule for the following UL-MU-MIMO transmission 410. FIG. 16 is a transmission and reception time diagram illustrating an example of sending multiple CTX messages 402A and 402B at the same time. As shown, the CTX messages 402A and 402B can be sent simultaneously using DL-MU-MIMO or DL-FDMA transmissions to one station each (STA 120A and 120B, respectively). The STAs 120A and 120B receive the CTX messages 402A and 402B and then begin the UL-MU-MIMO (or UL-FDMA) transmissions 410A and 410B. FIG. 17 is a transmission and reception time diagram and illustrates an example of sending the CTX messages within A-MPDU messages 407A and 407B. As in FIG. 16, the CTX portion of the A-MPDU messages 407A and 407B contain information for one STA (STA 120A and 120B, respectively) and the STAs 120A and 120B receive the messages 407A and 407B and begin the UL-MU-MIMO (or UL-FDMA) transmissions 410A and 410B.

In other embodiments, a STA 120 may not start an UL transmission after receiving a CTX message 402. In one embodiment the AP 110 defines a new frame that triggers a UL transmission. The new frame can be any frame indicated by the AP 110 and can comprise a NDP frame. In this embodiment, the new frame can include a sequence or token number that links the frame to the CTX so that the STA knows that the frame is the same trigger frame as indicated in the CTX and can begin an UL transmission. The frame can also include a duration so that other STAs 120 hearing the transmission can set their NAV. The STA 120 can acknowledge receipt of the CTX by sending an ACK or similar frame. In another embodiment a STA 120 can request the use of a trigger frame. The request can indicate that the trigger be immediate or delayed. One benefit of having a separate trigger frame can be that the trigger frame can give a STA more time to process the CTX before an UL transmission. Another benefit can be that the trigger frame can be a shorter frame than the CTX and can be sent at multiple times without subsequent CTX messages to allow for faster UL time. The trigger frame could follow the CTX immediately, or at a pre-specified offset or set of offsets from the CTX.

Figure 18:
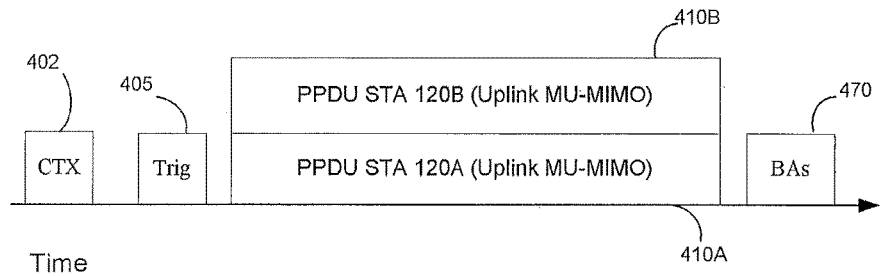
FIG. 18 shows an example of a frame exchange including a trigger frame.
Figure 19:
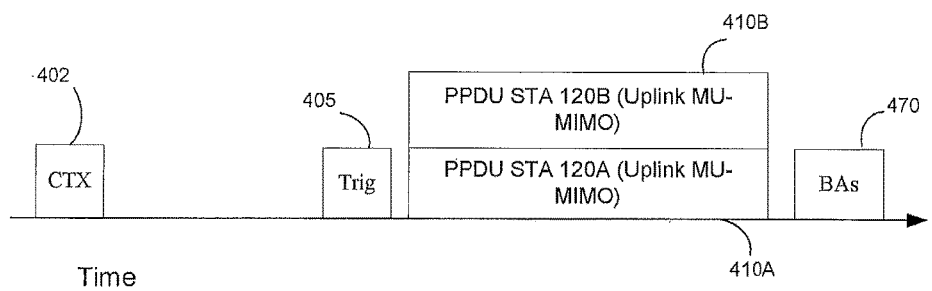
FIG. 19 shows another example of a frame exchange including a trigger frame.
Figure 20:
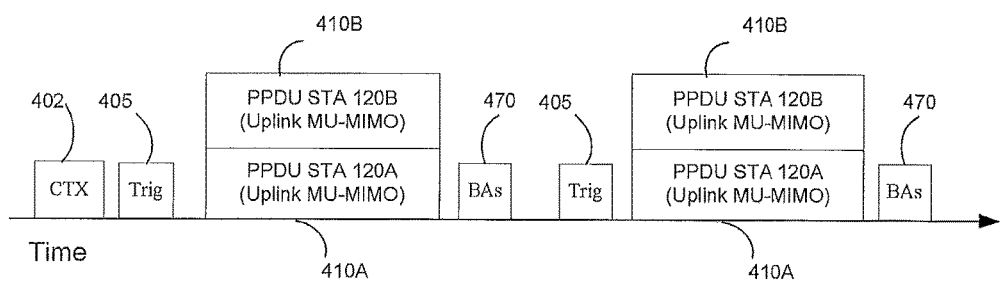
FIG. 20 shows another example of a frame exchange including a trigger frame.

FIG. 18 is a transmission and reception time diagram that illustrates one embodiment of a CTX/Trigger exchange. In this embodiment, the AP 110 sends a CTX message 402 to the STAs 120 and then later sends the trigger frame 405. Once the STAs 120A and 120B receive the trigger frame 405, they begin the UL-MU-MIMO transmissions 410A and 410B. FIG. 19 is a transmission and reception time diagram that illustrates an example where the time between the CTX message 402 and the trigger frame 405 is greater than that shown in FIG. 18. FIG. 20 is a transmission and reception time diagram that illustrates an example of sending multiple trigger frames 405 over time to initiate multiple UL-MU-MIMO 410 transmissions. In this embodiment, the second trigger frame 405 does not need to be preceded by the CTX 402 to initiate the second UL-MU-MIMO transmissions 410A and 410B because the STAs 120A and 120B can just confirm the trigger frame has the same sequence or token number as indicated in the CTX and begin transmission.

In some embodiments, if the AP 110 cannot multiplex ACKs or BAs to STAs 120 (i.e. the AP 110 is not using any DL-MU-MIMO or DL-FDMA to send ACKs to multiple STAs at the same time), then only one STA 120 can be allowed to set the BA policy to an immediate BA or a normal ACK and the AP 110 can be allowed to indicate which STA 120 in the CTX list can set the BA policy. The indication can be based on the position of the STA info field for that STA 120 in the CTX, such as the first position.

In another embodiment, if the AP 110 can multiplex ACKs or BAs to STAs 120, then more than one STA 120 can set the BA policy to immediate BA or normal ACK. In this embodiment, the AP 110 will use DL-MU-MIMO or DL-FDMA to send immediate ACKs to the multiple STAs 120 that indicated immediate BA or normal ACK at the same time. In a different embodiment, if a STA sets the BA policy to Delayed BA, then the AP 110 can send the BAs in a time sequence to the STAs 120. The time sequence can be separated by SIFS. In another embodiment, if a STA 120 sets the BA policy to BA, the AP 110 will wait for a poll from each STA 120 before sending a BA. In another embodiment, a broadcast BA frame can be defined, which includes block acknowledgments for multiple STAs 120. In case such a frame is used, multiple STAs 120 are allowed to set the ACK policy to immediate BA; the STAs 120 that set the ACK policy to immediate BA are acknowledged by the inclusion of the corresponding block acknowledgment in the broadcast BA frame sent immediately after the UL transmissions. The broadcast BA can also be used to acknowledge multiple STAs 120 that set a delayed BA policy; in this case the broadcast BA frame is sent with contention at a later time.

As discussed above, for example with respect to FIG. 17, in various embodiments, control information and/or trigger information can be encapsulated in an A-MPDU. For example, in FIG. 17 the A-MPDU 407 includes CTX scheduling, control, and/or trigger information as described above with respect to FIGS. 4-20. Similarly, in various embodiments, such scheduling, control, and/or trigger information can be included in an aggregated PPDU (A-PPDU) instead of, or in addition to a CTX. In other words, in some embodiments, one or more fields or indicators discussed above with respect to the CTX can be included in an A-PPDU, which can replace the CTX in one or more of the time sequence diagrams shown in FIGS. 4-20.

FIG. 21 is a diagram that illustrates one embodiment of an aggregated PPDU (A-PPDU) 2100. As shown in FIG. 21, the A-PPDU 2100 includes a common PHY header 2110, one or more per-PPDU headers 2120, 2140, and 2160, and one or more per-PPDU payloads 2130, 2150, and 2170.

Although the illustrated A-PPDU 2100 includes an SU PPDU header 2120 and payload 2130, and N-1 MU PPDU headers and payloads 2140-2170, a person having ordinary skill in the art will appreciate that the illustrated A-PPDU 2100 can include additional fields, fields can be rearranged, removed, and/or resized, and the contents of the fields varied. For example, in various embodiments, the SU PPDU header 2120 and payload 2130 can be in a different location, there can be more than one SU PPDU, there can be any number of MU PPDUs, etc.

The common PHY header 2110 serves to provide PHY layer information common to each PPDU in the A-PPDU 2100, such as acquisition and/or synchronization information. In various embodiments, the common PHY header 2110 can indicate (for example, via one or more bits or flags) whether the A-PPDU 2100 includes at least one PPDU with broadcast/multicast information that all STAs are instructed to decode. In an embodiment, when the indication is set, one or more STAs 120 can be configured to decode subsequent PPDUs in order to obtain the broadcast/multicast information (for example, in the SU payload 2130).

The SU PHY header 2120 serves to provide PHY layer information specific to the SU payload 2130. In various embodiments, the SU PHY header 2120 can indicate (for example, via one or more bits or flags) whether the A-PPDU 2100 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2130).

In the illustrated embodiment, the SU payload 2130 includes control information, for example broadcast data, multicast data, control information, and/or management information that can be decoded by both SU and MU STAs. In various embodiments, the SU PHY header 2120 and the SU payload 2130 can be broadcast or unicast. In various embodiments, the SU PHY header 2120 and the SU payload 2130 can be in a position other than first in the A-PPDU 2100.

The MU PHY header 2140 serves to provide PHY layer information specific to the MU payload 2150. In various embodiments, the MU PHY header 2140 can indicate (for example, via one or more bits or flags) whether the A-PPDU 2100 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2130).

As shown, the A-PPDU 2100 can include a total of N PPDUs. In various embodiments, the PHY header 2160 can be similar to one of the SU PHY header 2120 and the MU PHY header 2140. In various embodiments, the payload 2170 can be similar to one of the SU payload 2130 and the MU payload 2150. In various embodiments, the MU PPDUs can be omitted entirely.

In various embodiments, the A-PPDU 2100 of FIG. 21 can be used in conjunction with an UL MU MIMO/OFDMA protocol, such as for example 802.11ax. For example, the A-PPDU 2100 can include scheduling and/or trigger information discussed above with respect to the CTX and exchanges of FIGS. 4-20. Thus, in various embodiments, the AP 110 can transmit the A-PPDU 2100 to schedule UL PPDUs from one or more STAs 120. In various embodiments, such exchange can be referred to herein as an A-PPDU trigger exchange.

FIG. 22 is a transmission and reception time diagram that illustrates one embodiment of an A-PPDU 2200 trigger exchange. As shown in FIG. 22, the A-PPDU 2200 includes a common PHY header 2210, one or more per-PPDU headers 2220 and 2240, one or more per-PPDU payloads 2230 and 2250. The exchange further includes an one or more scheduled UL PPDUs 2280 and 2290. Although the illustrated A-PPDU 2200 trigger exchange includes one SU PPDU header 2220 and payload 2230, and one MU PPDU header 2240 and payload 2250, a person having ordinary skill in the art will appreciate that the illustrated A-PPDU 2200 trigger exchange can include additional fields, fields can be rearranged, removed, and/or resized, and the contents of the fields varied. For example, in various embodiments, the SU PPDU header 2220 and payload 2230 can be in a different location, there can be more than one SU PPDU, there can be any number of MU PPDUs, a different number of scheduled UL PPDUs, etc.

The common PHY header 2210 serves to provide PHY layer information common to each PPDU in the A-PPDU 2200, such as acquisition and/or synchronization information. In various embodiments, the common PHY header can indicate (for example, via one or more bits or flags) whether the A-PPDU 2200 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2230).

The SU PHY header 2220 serves to provide PHY layer information specific to the SU payload 2230. In various embodiments, the SU PHY header 2220 can indicate (for example, via one or more bits or flags) whether the A-PPDU 2200 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2230).

In the illustrated embodiment, the SU payload 2230 includes UL scheduling information 2230 for scheduling one or more UL PPDUs such as the UL PPDUs 2280 and 2290. In various embodiments, the UL scheduling information 2230 can include one or more fields or indicators discussed above with respect to one or more of: the CTX 402, 1035, 1200, and 1500, the CTS 408, the SSF 1005, the A-MPDU 407, the BAs 470, and the trigger frame 405, variously discussed above with respect to FIGS. 5-20. For example, in various embodiments, the UL scheduling information 2230 can include one or more of: identification of the STAs permitted or instructed to transmit one or more UL PPDUs, identification of resources allocated to STAs such as spatial streams, tones, etc., scheduling times and/or durations of UL transmissions, type and or content of scheduled UL transmissions, etc. In various embodiments, information included in the UL scheduling information 2230 can be omitted from the common PHY header 2210. In various embodiments, the SU PHY header 2220 and the SU payload 2230 can be broadcast or unicast. In various embodiments, the SU PHY header 2220 and the SU payload 2230 can be in a position other than first in the A-PPDU 2200.

The MU PHY header 2240 serves to provide PHY layer information specific to the MU payload 2250. In various embodiments, the MU PHY header 2240 can indicate (for example, via one or more bits or flags) whether the A-PPDU 2200 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2230).

In an embodiment, the AP 110 can transmit the A-PPDU 2200, with UL scheduling information 2230, to one or more STAs 120. The STAs 120 can decode the UL scheduling information and can determine a time that they are instructed to transmit an UL PPDU. In various embodiments, UL PPDUs can be spaced according to a short interframe space (SIFS), can be spaced according to another spacing, or can be unspaced. In the illustrated embodiment, the STAs 120 transmit the UL PPDU1 2280 and the UL PPDU2 2290 according to the UL scheduling information 2230.

FIGS. 23A-23D show time sequence diagrams 2300A-2300D that illustrate various embodiments of A-PPDU trigger exchanges. A person having ordinary skill in the art will appreciate that the illustrated A-PPDU trigger exchanges can include additional transmissions and/or fields, transmissions and/or fields can be rearranged, removed, and/or resized, and the contents of the transmissions and/or fields varied. For example, in various embodiments, the A-PPDU trigger exchange can optionally include a CTS 2310, which can precede an A-PPDU 2320A in embodiments where the A-PPDU 2320A is not legacy compatible. The CTS 2310 can set the NAV to protect the A-PPDU trigger exchange. In various embodiments, the A-PPDU trigger exchange can include another frame protecting the exchange, in addition to, or instead of, the CTS 2310.

As shown in FIG. 23A, the AP 110 can transmit the A-PPDU 2320A, including trigger information and one or more DL MU PPDUs, to one or more STAs 120. The STAs 120 can receive the DL MU PPDUs and can transmit one or more BAs 2330 based at least in part on the trigger information of the A-PPDU 2320A.

As shown in FIG. 23B, the AP 110 can transmit the A-PPDU 2320B, including trigger information and one or more DL MU PPDUs, to one or more STAs 120. The STAs 120 can receive the DL MU PPDUs and can transmit one or more BAs 2330 based at least in part on the trigger information of the A-PPDU 2320B. The STAs 120 can further transmit one or more MU-PPDUs 2340 based at least in part on the trigger information of the A-PPDU 2320B.

As shown in FIG. 23C, the AP 110 can transmit the A-PPDU 2320C, including trigger information, to one or more STAs 120. The STAs 120 can receive the DL MU PPDUs and can transmit one or more MU-PPDUs 2340 based at least in part on the trigger information of the A-PPDU 2320C. The AP 110 can transmit a A-PPDU 2350, including trigger information and BAs for the MU-PPDUs 2340, to one or more STAs 120. The STAs 120 can receive the BAs and can transmit one or more additional MU-PPDUs 2340 based at least in part on the trigger information of the A-PPDU 2350.

As shown in FIG. 23D, the AP 110 can transmit the A-PPDU 2320D, including trigger information and one or more DL MU PPDUs, to one or more STAs 120. The STAs 120 can receive the DL MU PPDUs and can transmit one or more BAs 2330 based at least in part on the trigger information of the A-PPDU 2320D. The STAs 120 can further transmit information about traffic ability to the AP 110 based at least in part on the trigger information of the A-PPDU 2320D. For example, in various embodiments traffic information can include one or more SIFs, such as the SIFs 1010 discussed above with respect to FIGS. 10-11.

Figure 24:
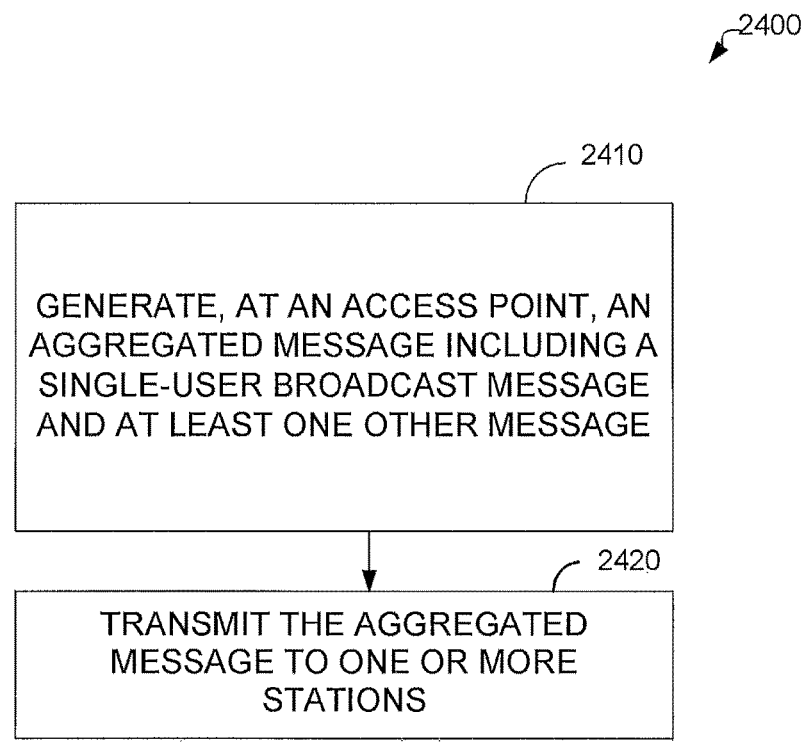
FIG. 24 shows a flowchart for an exemplary method of wireless communication that can be employed within the wireless communication system of FIG. 1.

FIG. 24 shows a flowchart 2400 for an exemplary method of wireless communication that can be employed within the wireless communication system 100 of FIG. 1. The method can be implemented in whole or in part by the devices described herein, such as the AP 110 (FIG. 1), any of the STAs 120 (FIG. 1), and the wireless device 302 shown in FIG. 3. Although the illustrated method is described herein with reference to the wireless communication system 100 discussed above with respect to FIG. 1, the wireless device 302 discussed above with respect to FIG. 3, and the frames and frame exchanges of FIGS. 4-20, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2410, an access point generates an aggregated message. The aggregated message includes a single-user broadcast message and at least one other message. For example, the AP 110 can generate the A-PPDU 2200 for transmission to one or more STAs 120. The A-PPDU 2200 can include the SU payload 2230 including UL scheduling information instructing the STAs 120 to transmit the UL PPDUs 2280-2290 at particular times. In various embodiments, the single-user broadcast message and the at least one other message can be referred to as "sub-messages" of the aggregated message.

In various embodiments, the aggregated message can include the single-user broadcast message and one or more multi-user messages. For example, the A-PPDU 2200 can include the SU PHY header 2220 and payload 2230, and the MU PHY header 2240 and payload 2250.

In various embodiments, each sub-message of the aggregated message can include at least a physical layer data unit (PPDU) comprising a physical layer (PHY) control field and a media access control (MAC) payload. In various embodiments, the at least one other message can include at least one multi-user physical layer data unit (PPDU). In various embodiments, the at least one other message can include at least one single-user physical layer data unit (PPDU) excluding control or scheduling information.

In various embodiments, the aggregated message can include a common physical layer header indicating whether the at least one other message includes at least message that all of the one or more stations are instructed to decode. For example, the A-PPDU 2200 can include the common PHY header 2210, which can indicate that the SU payload 2230 includes the UL scheduling information.

In various embodiments, each message can include a physical layer header indicating whether the at least one other message includes at least message that all of the one or more stations are instructed to decode. For example, the SU PHY header 2220 can indicate that the SU payload 2230 includes the UL scheduling information.

In various embodiments, the single-user broadcast message includes control information instructing the one or more stations to transmit uplink data at a specific time, and the uplink data can be received from the one or more stations. For example, the UL scheduling information 2230 can instruct the STAs 120 to transmit the UL PPDUs 2280-2290 beginning a SIFS after the MU payload 2250.

In various embodiments, each message can include an uplink scheduling message. For example, the SU payload 2230 can include the UL scheduling information. In various embodiments, the uplink scheduling message can include a physical layer data unit (PPDU) duration field indicating a duration of transmission of uplink data. In various embodiments, the uplink scheduling message can include a station (STA) info field including an indication of allowed transmission modes. For example, the UL scheduling information 2230 can include any of the fields of the CTX discussed above with respect to FIGS. 4-20.

In various embodiments, the station (STA) info field can include a tone allocation field indicating tones/frequencies for uplink data using a frequency division multiple access (FDMA) system. In various embodiments, the uplink scheduling message can include a group identifier (GID) field indicating the STAs that can participate in uplink communications. In various embodiments, the uplink scheduling message can include a receiver address (RA) field indicating a multicast address which identifies the one or more stations that can participate in uplink communications. In various embodiments, the uplink scheduling message can include a field indicating rate information for the one or more stations. For example, the UL scheduling information 2230 can include any of the fields of the CTX discussed above with respect to FIGS. 4-20.

In various embodiments, the method can further include transmitting an uplink scheduling message to the one or more stations. The uplink scheduling message can instruct the one or more stations to transmit a station access information message in response to the uplink scheduling message. The method can further include receiving a plurality of station access information messages. The station access information messages can indicate station access information. For example, the UL scheduling information 2230 can instruct the STAs 120 to provide the traffic information 2360. In various embodiments, the single-user broadcast message can include data, control, or management information for one or more stations.

Next, at block 2420, the access point transmits the aggregated message to one or more stations. For example, the AP 110 can transmit the A-PPDU 2200 to the STAs 120. The AP 110 can receive one or more of the UL PPDUs 2280-2290 from the one or more STAs 120. In various embodiments, receiving a plurality of uplink data can include receiving a plurality of uplink data having the same duration. For example, the UL PPDU 2280 and the UL PPDU 2290 can have the same duration as each other. Each of the UL PPDUs 2280 and 2290 can include multiple UL PPDUs simultaneously transmitted by one or more STAs 120 according to MU-MIMO and/or OFDMA. In various embodiments, the method can further include transmitting an acknowledgment message to the one or more stations. For example, the AP 110 can transmit the BAs 2350, in some embodiments with additional trigger information.

In an embodiment, the method shown in FIG. 24 can be implemented in a wireless device that can include a providing circuit, a transmitting circuit, and a receiving circuit. Those skilled in the art will appreciate that a wireless device can have more components than the simplified wireless device described herein. The wireless device described herein includes only those components useful for describing some prominent features of implementations within the scope of the claims.

The providing circuit can be configured to provide the aggregated message for transmission. In an embodiment, the providing circuit can be configured to implement block 2410 of the flowchart 2400 (FIG. 24). The providing circuit can include one or more of the transmitter 310 (FIG. 3), the transceiver 314 (FIG. 3), the processor 304 (FIG. 3), the DSP 320 (FIG. 3), and the memory 306 (FIG. 3). In some implementations, means for providing can include the providing circuit.

The transmitting circuit can be configured to transmit the aggregated message. In an embodiment, the transmitting circuit can be configured to implement block 2410 of the flowchart 2400 (FIG. 24). The transmitting circuit can include one or more of the transmitter 310 (FIG. 3), the transceiver 314 (FIG. 3), the processor 304 (FIG. 3), the DSP 320 (FIG. 3), and the memory 306 (FIG. 3). In some implementations, means for transmitting can include the transmitting circuit.

The receiving circuit can be configured to receive the uplink messages. In an embodiment, the receiving circuit can be configured to implement block 2420 of the flowchart 2400 (FIG. 24). The receiving circuit can include one or more of the receiver 312 (FIG. 3), the transceiver 314 (FIG. 3), the processor 304 (FIG. 3), the DSP 320 (FIG. 3), the signal detector 318 (FIG. 3), and the memory 306 (FIG. 3). In some implementations, means for receiving can include the receiving circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method for wireless communication, comprising:
generating, at an access point, an aggregated message comprising a broadcast message and at least one other message, the broadcast message and the at least one other message each comprising a payload, and the aggregated message including a duration field indicating a duration for each of a plurality of stations to transmit an uplink transmission;
transmitting the aggregated message to the plurality of stations; and
receiving a respective uplink transmission from each of the plurality of stations during the indicated duration;
wherein a physical layer header of the broadcast message includes a flag or bit that indicates whether the plurality of stations are instructed to decode the payload of the broadcast message; and
wherein the payload of the broadcast message includes control information instructing the plurality of stations to transmit their respective uplink transmissions during the indicated duration.

2. The method of claim 1, wherein the at least one other message comprises at least one multi-user physical layer data unit (PPDU).

3. The method of claim 1, wherein the at least one other message comprises at least one physical layer data unit (PPDU) excluding control or scheduling information.

4. The method of claim 1, wherein a physical layer header of the at least one other message indicates whether the at least one other message includes at least a message that all of the plurality of stations are instructed to decode.

5. The method of claim 1, further comprising transmitting an acknowledgment message to the plurality of stations.

6. The method of claim 1, wherein each of the broadcast message and at least one other message comprises an uplink scheduling message.

7. The method of claim 6, wherein the uplink scheduling message comprises a station (STA) info field comprising an indication of allowed transmission modes.

8. The method of claim 7, wherein the station (STA) info field comprises a tone allocation field indicating frequency tones for uplink data using a frequency division multiple access (FDMA) system.

9. The method of claim 6, wherein the uplink scheduling message comprises a receiver address (RA) field indicating a multicast address which identifies the plurality of stations allowed to participate in uplink communications.

10. The method of claim 6, wherein the uplink scheduling message comprises a field indicating rate information for the plurality of stations.

11. The method of claim 1, further comprising:
transmitting an uplink scheduling message to the plurality of stations, the uplink scheduling message instructing the plurality of stations to transmit a station access information message in response to the uplink scheduling message; and
receiving a plurality of station access information messages, each of the plurality of station access information messages indicating station access information.

12. An apparatus configured for wireless communication, comprising:
a processor configured to generate for transmission an aggregated message comprising a broadcast message and at least one other message, the broadcast message and the at least one other message each comprising a payload, and the aggregated message including a duration field indicating a duration for each of a plurality of stations to transmit an uplink transmission;
a transmitter configured to transmit the aggregated message to the plurality of stations; and
a receiver configured to receive a respective uplink transmission from each the plurality of stations during the indicated duration;
wherein a physical layer header of the broadcast message includes a flag or bit that indicates whether the plurality of stations are instructed to decode the payload of the broadcast message; and
wherein the payload of the broadcast message includes control information instructing the plurality of stations to transmit their respective uplink transmissions during the indicated duration.

13. The apparatus of claim 12, wherein the at least one other message comprises at least one physical layer data unit (PPDU) excluding control or scheduling information.

14. The apparatus of claim 12, wherein the aggregated message comprises the broadcast message and one or more multi-user messages.

15. The apparatus of claim 12, wherein a physical layer header of the at least one other message indicates whether the at least one other message includes at least a message that all of the plurality of stations are instructed to decode.

16. The apparatus of claim 12, wherein each of the broadcast message and the at least one other message comprises an uplink scheduling message.

17. The apparatus of claim 16, wherein the uplink scheduling message comprises a physical layer data unit (PPDU) duration field indicating the duration.

18. The apparatus of claim 16, wherein the uplink scheduling message comprises a station (STA) info field comprising an indication of allowed transmission modes.

19. The apparatus of claim 18, wherein the station (STA) info field comprises a tone allocation field indicating tones/frequencies for uplink data using a frequency division multiple access (FDMA) system.

20. The apparatus of claim 16, wherein the uplink scheduling message comprises a receiver address (RA) field indicating a multicast address which identifies the plurality of stations that can participate in uplink communications.

21. The apparatus of claim 12, wherein the broadcast message comprises data, control, or management information for the plurality of stations.

22. The apparatus of claim 12, further comprising:
a transmitter configured to transmit an uplink scheduling message to the plurality of stations, the uplink scheduling message instructing the plurality of stations to transmit a station access information message in response to the uplink scheduling message,
wherein a receiver of the apparatus is configured to receive a plurality of station access information messages, the station access information messages indicating station access information.

23. An apparatus for wireless communication, comprising:
means for generating an aggregated message comprising a broadcast message and at least one other message, the broadcast message and the at least one other message each comprising a payload, and the aggregated message including a duration field indicating a duration for each of a plurality of stations to transmit an uplink transmission;

means for transmitting the aggregated message to the plurality of stations; and means for receiving a respective uplink transmission from each of the plurality of stations during the indicated duration;

wherein a physical layer header of the broadcast message includes a flag or bit that indicates whether the plurality of stations are instructed to decode the payload of the broadcast message; and wherein the payload of the broadcast message includes control information instructing the plurality of stations to transmit their respective uplink transmissions during the indicated duration.

24. A non-transitory computer-readable medium comprising code that, when executed, causes an apparatus to:

generate an aggregated message comprising a broadcast message and at least one other message, the broadcast message and the at least one other message each comprising a payload, and the aggregated message including a duration field indicating a duration for each of a plurality of stations to transmit an uplink transmission;

transmit the aggregated message to the plurality of stations; and receive a respective uplink transmission from each of the plurality of stations during the indicated duration;

wherein a physical layer header of the broadcast message includes a flag or bit that indicates whether the plurality of stations are instructed to decode the payload of the broadcast message; and wherein the payload of the broadcast message includes control information instructing the plurality of stations to transmit their respective uplink transmissions during the indicated duration.

25. A method for wireless communication, comprising:

generating, at an access point, an aggregated message comprising a broadcast message and at least one other message, the broadcast message comprising a payload, and the aggregated message including a duration field indicating a duration for each of a plurality of stations to transmit an uplink transmission;

transmitting the aggregated message to the plurality of stations; and receiving a respective uplink transmission from each of the plurality of stations during the indicated duration;

wherein the aggregated message comprises a common physical layer header indicating whether the at least one other message includes at least a payload that all of the plurality of stations are instructed to decode, and wherein a physical layer header of the broadcast message includes a flag or bit that indicates whether the plurality of stations are instructed to decode the payload of the broadcast message; and wherein the payload of the broadcast message includes control information instructing the plurality of stations to transmit their respective uplink transmissions during the indicated duration.

26. An apparatus configured for wireless communication, comprising:

a processor configured to generate for transmission an aggregated message comprising a broadcast message and at least one other message, the broadcast message comprising a payload, and the aggregated message including a duration field indicating a duration for each of a plurality of stations to transmit an uplink transmission;

a transmitter configured to transmit the aggregated message to the plurality of stations; and a receiver configured to receive a respective uplink transmission from each of the plurality of stations during the indicated duration;

wherein the aggregated message comprises a common physical layer header indicating whether the at least one other message includes at least a payload that all of the plurality of stations are instructed to decode, and wherein a physical layer header of the broadcast message includes a flag or bit that indicates whether the plurality of stations are instructed to decode the payload of the broadcast message; and wherein the payload of the broadcast message includes control information instructing the plurality of stations to transmit their respective uplink transmissions during the indicated duration.

27. An apparatus for wireless communication, comprising:

means for generating an aggregated message comprising a broadcast message and at least one other message, the broadcast message comprising a payload, and the aggregated message including a duration field indicating a duration for each of a plurality of stations to transmit an uplink transmission;

means for transmitting the aggregated message to the plurality of stations; and means for receiving a respective uplink transmission from each of the plurality of stations during the indicated duration;

wherein the aggregated message comprises a common physical layer header indicating whether the at least one other message includes at least a payload that all of the plurality of stations are instructed to decode, and wherein a physical layer header of the broadcast message includes a flag or bit that indicates whether the plurality of stations are instructed to decode the payload of the broadcast message; and wherein the payload of the broadcast message includes control information instructing the plurality of stations to transmit their respective uplink transmissions during the indicated duration.

28. A non-transitory computer-readable medium comprising code that, when executed, causes an apparatus to:

generate an aggregated message comprising a broadcast message and at least one other message, the broadcast message comprising a payload, and the aggregated message including a duration field indicating a duration for each of a plurality of stations to transmit an uplink transmission;

transmit the aggregated message to the plurality of stations; and receive a respective uplink transmission from each of the plurality of stations during the indicated duration;

wherein the aggregated message comprises a common physical layer header indicating whether the at least one other message includes at least a payload that all of the plurality of stations are instructed to decode, and wherein a physical layer header of the broadcast message includes a flag or bit that indicates whether the plurality of stations are instructed to decode the payload of the broadcast message; and wherein the payload of the broadcast message includes control information instructing the plurality of stations to transmit their respective uplink transmissions during the indicated duration.

* * * * *